(12) United States Patent
Komatsu et al.

(10) Patent No.: US 8,289,308 B2
(45) Date of Patent: Oct. 16, 2012

(54) METHOD OF DRIVING ELECTROPHORETIC SHEET, DISPLAY DEVICE AND ELECTRONIC APPARATUS

(75) Inventors: Harunobu Komatsu, Matsumoto (JP);
Hironobu Hashimoto, Kawanishi (JP)

(73) Assignee: Seiko Epson Corporation, Tokyo (JP)

( * ) Notice: Subject to any disclaimer, the term of this patent is extended or adjusted under 35 U.S.C. 154(b) by 518 days.

(21) Appl. No.: 12/569,461

(22) Filed: Sep. 29, 2009

(65) Prior Publication Data

US 2010/0079436 A1 Apr. 1, 2010

(30) Foreign Application Priority Data

Sep. 30, 2008 (JP) ................................. 2008-255231

(51) Int. Cl.
*G06F 3/038* (2006.01)
(52) U.S. Cl. .............. 345/211; 345/52; 345/50; 345/96; 345/209
(58) Field of Classification Search ........................ None
See application file for complete search history.

(56) References Cited

U.S. PATENT DOCUMENTS 7,830,340 B2 * 11/2010 Umezaki ........................ 345/76
2007/0024953 A1 2/2007 Kanbe

FOREIGN PATENT DOCUMENTS

| JP | A-2000-35775 | 2/2000 |
| JP | A-2007-58151 | 3/2007 |

* cited by examiner

*Primary Examiner* — Muhammad N Edun
(74) *Attorney, Agent, or Firm* — Oliff & Berridge, PLC

(57) ABSTRACT

A method of driving an electrophoretic display device (a display device) having a first electrode, a second electrode, a microcapsule-containing layer (a display section), a capacitance element, and a voltage application switching element, comprising a first state in which the voltage application switching element is placed in ON state to apply a voltage between the electrodes and to charge an electric charge in the capacitance element, a second state in which the voltage is applied between the electrodes through discharging of the electric charge stored in the capacitance element, and a third state in which the voltage is not applied between the electrodes and the electric charge stored in the capacitance element is discharged.

20 Claims, 10 Drawing Sheets

METHOD OF DRIVING ELECTROPHORETIC SHEET, DISPLAY DEVICE AND ELECTRONIC APPARATUS

This application claims priority to Japanese patent application No. 2008-255231 filed Sep. 30, 2008, and the said application is herein incorporated in the present specification.

BACKGROUND OF THE INVENTION

1. Field of Invention

The present invention relates to methods of driving a display device, display devices and electronic apparatuses.

2. Description of Related Technology

For example, as devices composing display sections of an electronic paper that displays an image thereon, electrophoretic display devices that use electrophoresis of particles are known (for example, see Japanese Laid-open Patent Application 2007-58151 (hereinafter referred to as "Patent Document 1") and Japanese Laid-open Patent Application 2000-35775 (hereinafter referred to as "Patent Document 2")). Electrophoretic display devices have excellent mobility and power saving property, and are particularly suitable as image display sections of electronic paper.

Patent Document 1 discloses an electrophoretic display device that composes pixels of an electrophoretic display. The electrophoretic display device has a pair of oppositely disposed electrodes (a common electrode and a pixel electrode), and a microcapsule-containing layer that is provided between these electrodes and includes a plurality of microcapsules and binder. According to the electrophoretic display device having such a structure, a voltage is applied between the pair of electrodes by a voltage application device to cause electric fields to act on the microcapsules so that electrophoretic particles encapsulated in the microcapsules are moved by electrophoresis, thereby changing displayed color.

As described above, switching of displayed color by electrophoresis of electrophoretic particles is conducted through applying a voltage between the pair of electrodes, using the voltage application device, in order to cause electric fields to act on the microcapsules. For the purpose of shortening the time of voltage application to each pixel by the voltage application device and applying a voltage to other pixels promptly, an electrophoretic display device that is equipped with a capacitor (capacitor element) connected to a pair of electrodes has been proposed (for example, see Patent Document 2).

According to the electrophoretic display device having such a structure, when a voltage is applied between the pair of electrodes by a voltage application device, an electric charge is charged in the capacitor. For this reason, even after the voltage application by the voltage application device is finished, a voltage is continued to be applied between the pair of electrodes due to discharging of the electric charge stored in the capacitor (see FIG. 4 of Patent Document 2). As a result, the voltage application time to each pixel by the voltage application device can be shortened, and the voltage application to other pixels can be promptly conducted, whereby high-speed image display becomes possible.

However, the electrophoretic display device having the structure equipped with the capacitor connected to the pair of electrodes entails a problem in that the contrast of each color lowers, resulting from a reduction in the reflectance of white color or black color.

SUMMARY OF THE INVENTION

In accordance with some embodiments of the invention, it is to provide a method of driving a display device which is capable of displaying images at high speed and displaying them with high contrast, a display device that is driven by the driving method, and a highly reliable electronic apparatus equipped with the display device.

Means for Solving the Problems

A method of driving a display device in accordance with the invention pertains to a method of driving a display device having a first electrode, a second electrode, a display section that is provided between the first electrode and the second electrode and includes movable particles that move by application of a voltage between the first electrode and the second electrode, a capacitance element that is electrically connected to the first electrode, and a voltage application switching element for applying a voltage to both of the first electrode and the capacitance element, and is characterized in comprising a first state in which the voltage application switching element is placed in ON state to apply a voltage between the first electrode and the second electrode and to charge an electric charge in the capacitance element, a second state in which the voltage application switching element is placed in OFF state so that the voltage is applied between the first electrode and the second electrode through discharging of the electric charge stored in the capacitance element, and a third state in which the voltage is not applied between the first electrode and the second electrode and the electric charge stored in the capacitance element is discharged.

This can provide a method of driving a display device that is capable of high-speed image display and display with a high contrast.

According to the method of driving a display device in accordance with the invention, the voltage application switching element is connected to a voltage application device that is capable of applying a desired voltage, and it is preferred to set the third state by placing the voltage application switching element in OFF state after the electric charge stored in the capacitance element has been discharged by setting the voltage application device to 0 potential while maintaining the voltage application switching element in ON state.

This can reliably set the third state in which the electric charge stored in the capacitance element is discharged while a voltage is not applied between the pair of electrodes.

According to the method of driving a display device in accordance with the invention, an erasing switching element that is connected to the capacitance element is further included, and it is preferred to set the third state by discharging the electric charge stored in the capacitance element by placing the erasing switching element in ON state while maintaining the voltage application switching element in OFF state.

This can reliably set the third state in which the electric charge stored in the capacitance element is discharged while a voltage is not applied between the pair of electrodes.

The method of driving a display device in accordance with the invention may preferably be characterized in having a first stage in which the second state is set after setting the first state, and a second stage in which the third state is set after setting the first state.

This can provide a method of driving an electrophoretic display device that is capable of high-speed image display, and high contrast display.

According to the method of driving a display device in accordance with the invention, the first stage may preferably be set prior to the second stage.

This can provide a method of driving an electrophoretic display device that is capable of high-speed image display, and high contrast display.

According to the method of driving a display device in accordance with the invention, the first stage may preferably be conducted plural times.

By this, moveable particles can be reliably separated from the pair of electrodes, and can be reliably electrophoretically moved toward the opposing electrodes.

According to the method of driving a display device in accordance with the invention, the second stage may preferably be conducted plural times.

This can prevent moveable particles of different colors from being bonded together, while the moveable particles can be reliably electrophoretically moved toward opposing electrodes.

According to the method of driving a display device in accordance with the invention, after the second stage, a third stage of setting the second state after setting the first state may preferably be conducted.

This makes moveable particles promptly distributed to a target electrode side, and makes the displayed color promptly changed.

According to the method of driving a display device in accordance with the invention, the time of setting the first state may preferably be 1-400 msec.

By this, an electric charge can be reliably charged in the capacitance element, and moveable particles can be reliably moved.

According to the method of driving a display device in accordance with the invention, the time of setting the second state may preferably be 10-500 msec.

By this, the voltage that is applied across the pair of electrodes can be prevented from excessively lowering due to discharging of the electric charge stored in the capacitance element, and moveable particles can be reliably moved.

According to the method of driving a display device in accordance with the invention, the time of setting the third state may preferably be 10-200 msec.

This can more reliably prevent generation of relatively positive portion and negative portion within each moveable particle, and can realize high-speed image display of a display device.

According to the method of driving a display device in accordance with the invention, the display device may preferably be an electrophoretic display device with the display section that is equipped with an electrophoretic layer containing at least one type of electrophoretic particles.

The method of driving a display device in accordance with the invention may favorably be applied to driving of an electrophoretic display device.

A display device in accordance with the present invention is characterized in that it is composed to be driven by the method of driving a display device in accordance with the invention.

This can provided a display device that is capable of displaying images at high-speed, and also is capable of displaying them with high contrast.

An electronic apparatus in accordance with the invention is characterized in comprising the display device in accordance with the invention.

By this, a highly reliable electronic apparatus can be obtained.

DETAILED DESCRIPTION OF PREFERRED EMBODIMENTS

Hereinafter, a method of driving a display device, a display device and an electronic apparatus in accordance with the present invention shall be described in detail with reference to preferred embodiments shown in the accompanying drawings.

<Electrophoretic Display Device>

First, description shall be made as to a case in which a method of driving a display device in accordance with the invention is applied to an electrophoretic display device (a display device in accordance with the invention).

<<First Embodiment>>

First, a first embodiment of an electrophoretic display device to which the method of driving a display device in accordance with the invention is applied shall be described.

Figure 1:
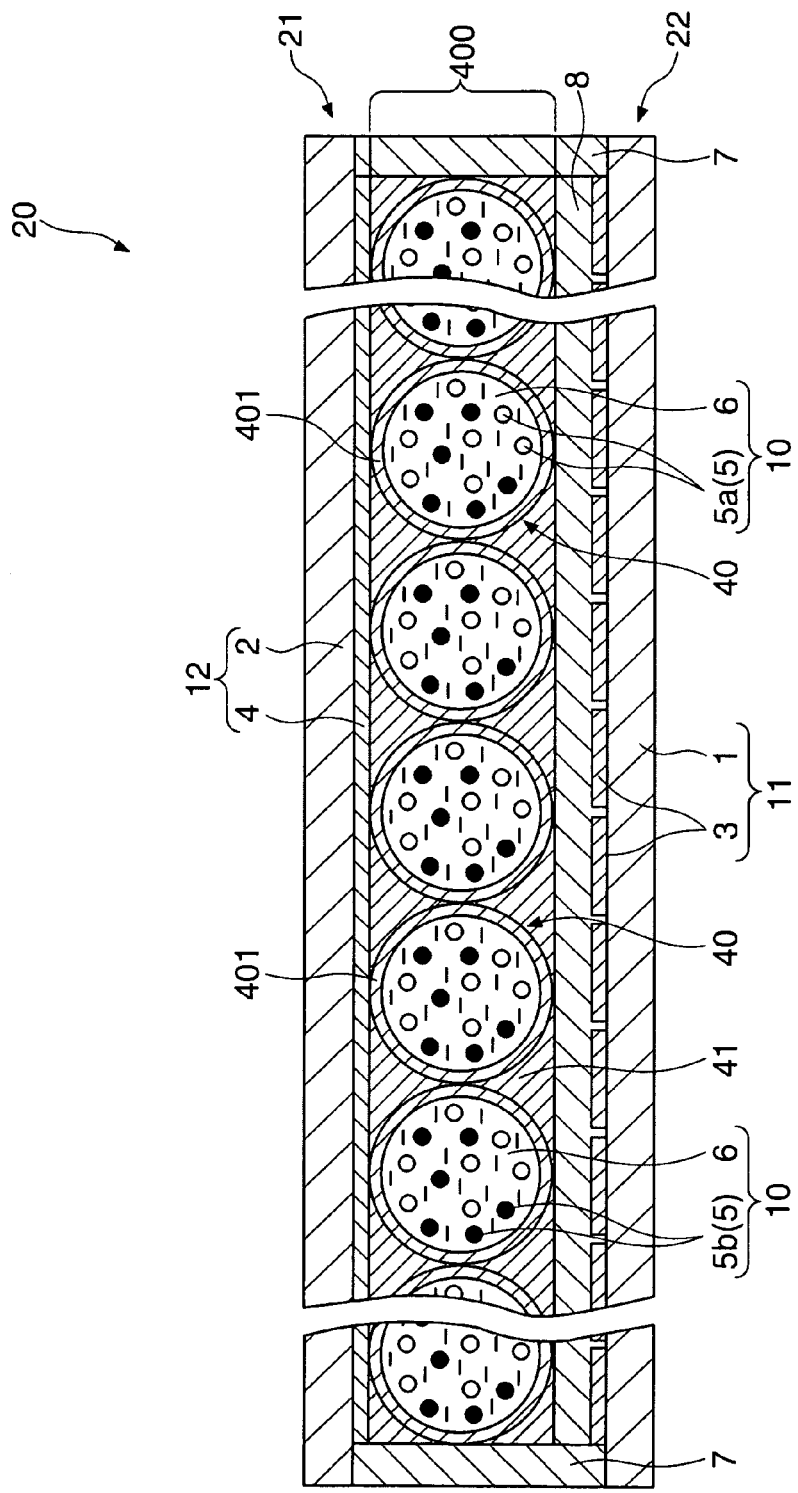
FIG. 1 is a view schematically showing a vertical cross section of a first embodiment of an electrophoretic display device to which a driving method of the invention is applied.
Figure 2:
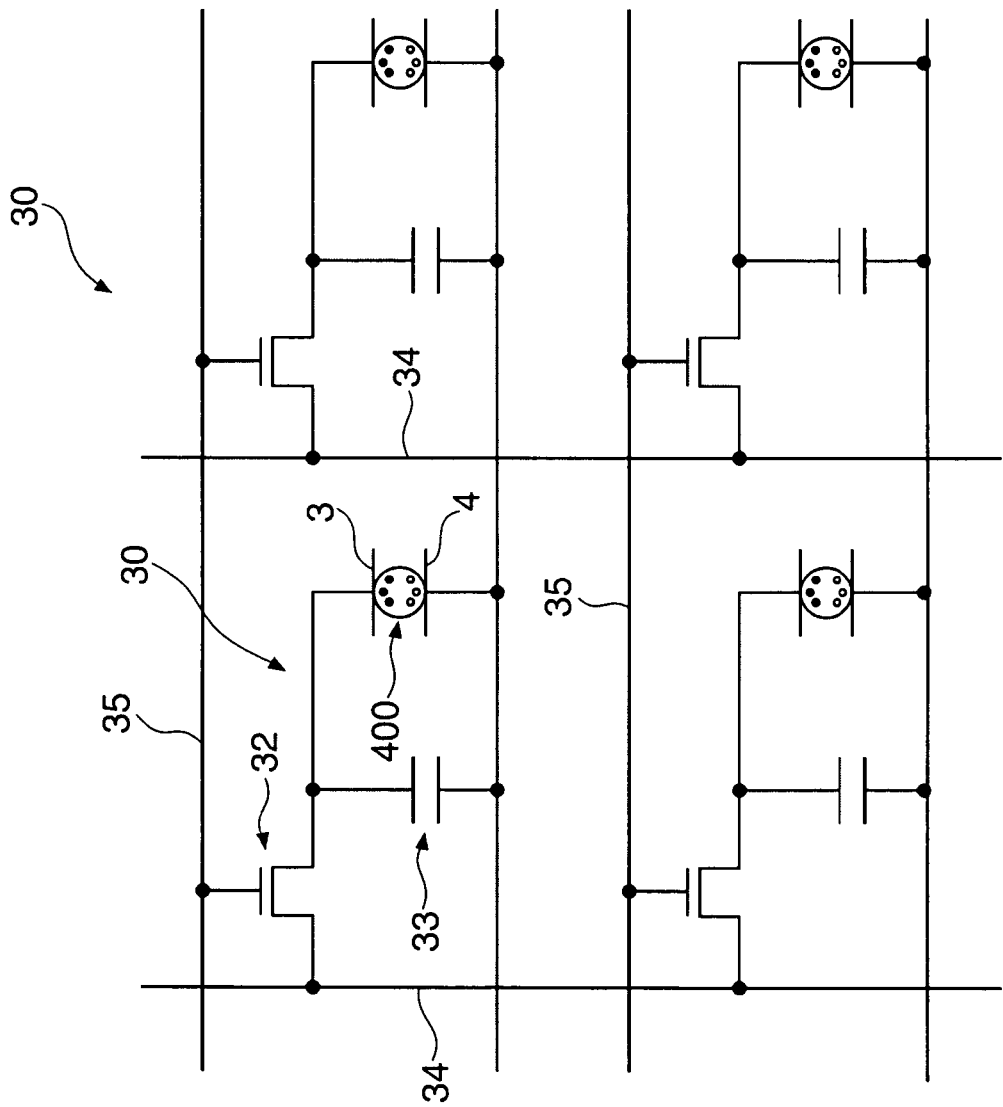
FIG. 2 is a view schematically showing the structure of a driving circuit of the electrophoretic display device of the first embodiment.
Figure 3:
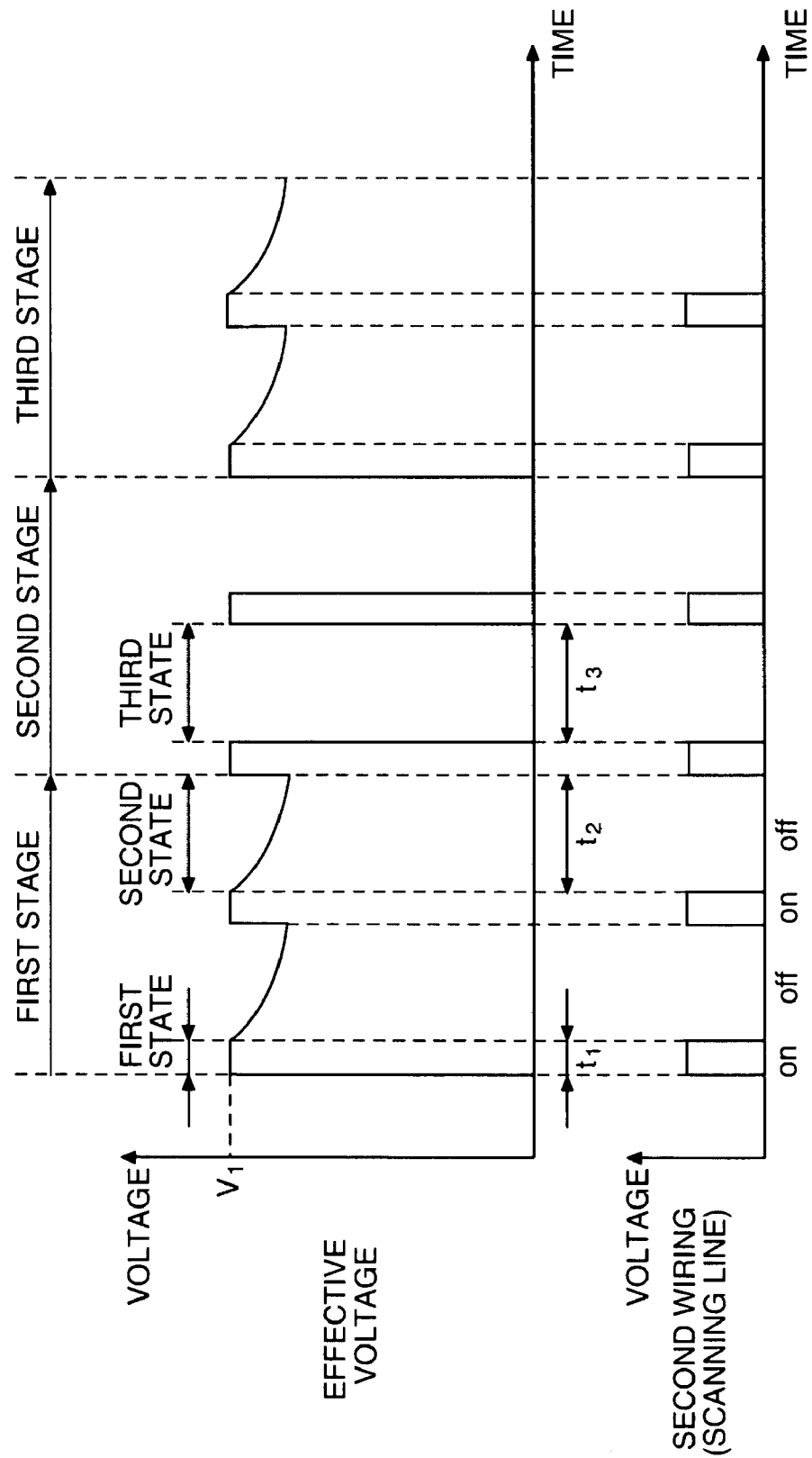
FIG. 3 is a chart showing the voltage to be applied between a pair of electrodes and the timing to turn ON and OFF of a voltage application switching element.
Figure 4A:
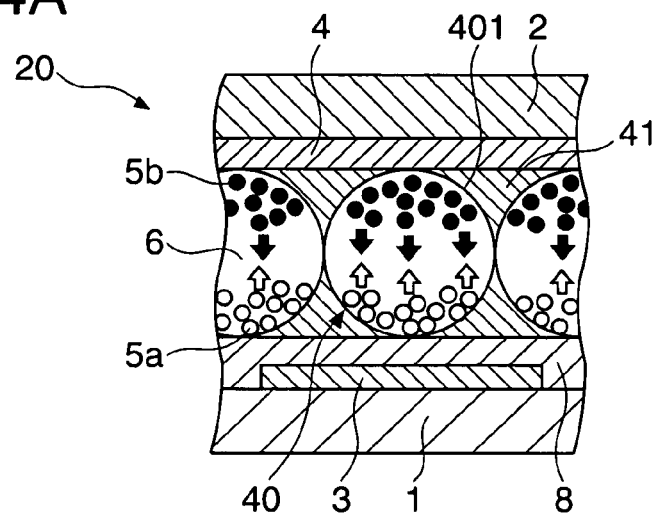
FIGS. 4A, 4B and 4C are schematic diagrams for explaining behavior of electrophoretic particles when displaying white color by the electrophoretic display device in accordance with the first embodiment.
Figure 4B:
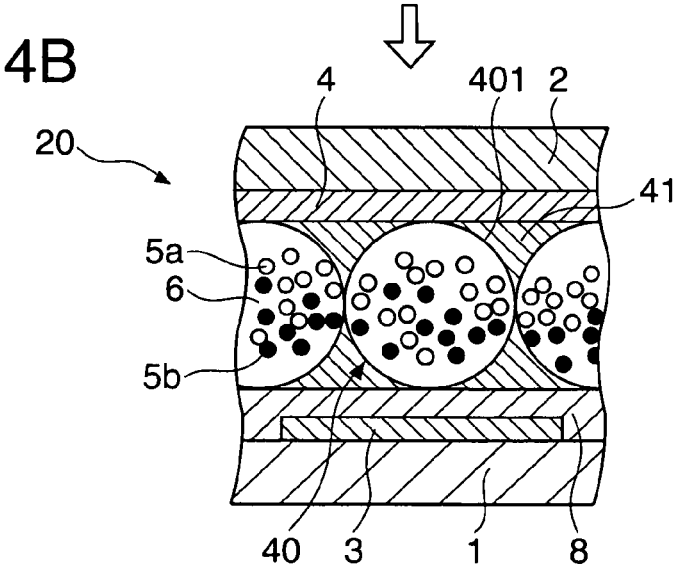
Figure 4C:
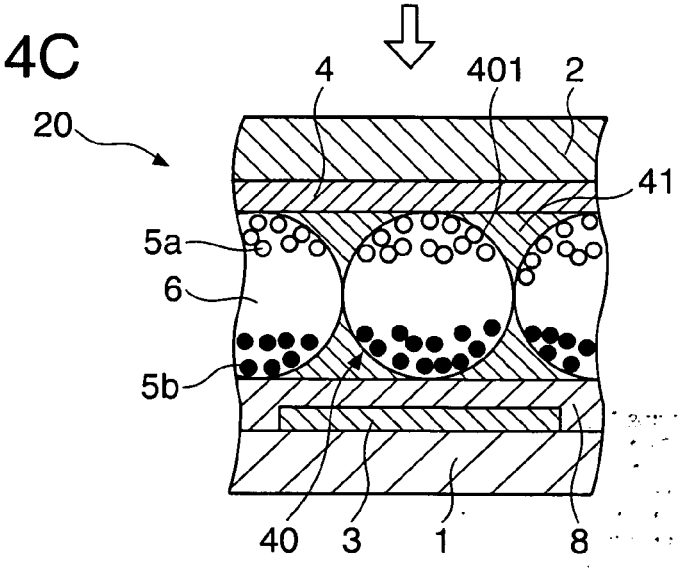

FIG. 1 is a view schematically showing a vertical cross section of a first embodiment of an electrophoretic display device to which the driving method of the invention is applied. FIG. 2 is a view schematically showing the structure of a driving circuit of the electrophoretic display device of the first embodiment. FIG. 3 is a chart (a timing chart) showing the voltage to be applied between a pair of electrodes and the timing to turn ON and OFF of a voltage application switching element. FIG. 4 are schematic diagrams for explaining behavior of electrophoretic particles when displaying white color by the electrophoretic display device in accordance with the first embodiment. It is noted that, hereinafter, description shall be made with the upper side in FIG. 1 and FIG. 4 being referred to as "upper" and the lower side being referred to as "lower" for the sake of convenience in description.

An electrophoretic display device 20 shown in FIG. 1 includes an electrophoretic display sheet (a front plane) 21, a circuit substrate (a back plane) 22, an adhesive agent layer 8 for bonding the electrophoretic display sheet 21 and the circuit board 22 together, and a sealing part 7 for air-tightly sealing a gap between the electrophoretic display sheet 21 and the circuit substrate 22.

The electrophoretic display sheet 21 includes a substrate 12 equipped with a plate-like base portion 2 and a second electrode 4 provided on a lower surface of the base portion 2, and a microcapsule-containing layer 400 that is provided on a lower surface side (one of surfaces) of the substrate 12 and is comprised of microcapsules 40 and binder 41.

On the other hand, the circuit substrate 22 includes a counter substrate 11 equipped with a plate-like base portion 1 and a plurality of first electrodes 3 provided on an upper surface of the base portion 1, and a circuit 30 provided in the counter substrate 11 (on the base portion 1), which includes a switching section 31 corresponding to each of the first electrodes 3.

Hereinbelow, compositions of the respective parts will be described one by another.

The base portion 1 and the base portion 2 are each formed from a sheet-like (plate-like) member, and have a function of supporting and protecting the respective members arranged therebetween.

Although each of the base portions 1 and 2 may be either flexible or rigid, it is preferred to have flexibility. Use of the base portions 1 and 2 having flexibility makes it possible to provide a flexible electrophoretic display device 20, in other words, an electrophoretic display device 20 useful in constructing, for example, an electronic paper.

Also, in the case where each of the base portions (base material layers) 1 and 2 is provided with flexibility, as a constituent material of each of them, for example, it is possible to use polyolefin such as polyethylene, modified polyolefin, polyamide, thermoplastic polyimide, polyether, polyether ether ketone, various kinds of polyurethane-based or chlorinated polyethylene-based thermoplastic elastomers, and copolymers, blends or polymer alloys mainly constituted of the above materials. One or more of these materials may be used independently or in combination.

An average thickness of each of the base portions 1 and 2 may be arbitrarily set depending on the constituent material and use thereof without any particular limitation but, in the case where they are to have flexibility, it is preferably in the range of about 20-500 µm, and more preferably in the range of about 25-250 µm. This makes it possible to achieve size-reduction (especially, thickness-reduction) of the electrophoretic display device 20, while harmonizing flexibility and strength of the electrophoretic display device 20.

The first electrodes 3 and the second electrode 4 each in a layer (a film) are respectively arranged on surfaces of the base portions 1 and 2 on the side of the microcapsules 40, in other word, on the upper surface of the base portion 1 and the lower surface of the base portion 2.

When a voltage is applied across the first electrodes 3 and the second electrode 4, electric fields are generated there between, and the electric fields act on electrophoretic particles (moveable particles) 5.

In this embodiment, the second electrode 4 serves as a common electrode and the first electrodes 3 function as individual electrodes divided in a matrix (pixel electrodes connected to the voltage application switching elements), and each portion where the second electrode 4 overlaps one of the first electrodes 3 constitutes a unit pixel.

Just like the first electrodes 3, the second electrode 4 may be divided into a plurality portions.

Each of the electrodes 3 and 4 is not particularly limited to any specific constituent material as long as it is substantially conductive. For examples, a variety of conductive materials can be enumerated, including: a metallic material such as copper, aluminum or alloy containing these metals; a carbon-based material such as carbon black; an electronically conductive polymer material such as polyacetylene, polyfluorene or derivatives thereof, an ion-conductive polymer material produced by dispersing an ionic substance such as NaCl or $Cu(CF_3 SO_3)_2$ in a matrix resin such as polyvinyl alcohol or polycarbonate; and a conductive oxide material such as indium oxide (IO); and the like. One or more of these materials may be used independently or in combination.

An average thickness of each of the electrodes 3 and 4 may be arbitrarily set depending on the constituent material and use thereof, without any particular limitation to a specific value, and is preferably in the range of about 0.05-10 µm, and more preferably in the range of about 0.05-5 µm.

It is noted that, among the base portions 1 and 2 and the electrodes 3 and 4, a base portion and an electrode disposed on the display surface side (the base portion 2 and the second electrode 4 in the present embodiment) are optically transparent, in other words, substantially transparent (clear and colorless, clear and colored, or translucent) to visible lights. This makes it possible to easily recognize, through visual observation, a status of the electrophoretic particles 5 in an electrophoretic dispersing liquid 10 to be described below, i.e., information (images) displayed by the electrophoretic display device 20.

The electrophoretic display sheet 21 is provided with the microcapsule-containing layer (an electrophoretic layer) 400 that is in contact with a lower surface of the second electrode 4.

The microcapsule-containing layer 400 is formed from a plurality of microcapsules 40 each having a capsule body (a shell) 401 encapsulating electrophoretic dispersion liquid 10, and a binder 41 for fixing (or holding) them in place.

It is noted that, according to the electrophoretic display device 20 of the present embodiment, the microcapsule-containing layer 400 composes a display section, and the electrophoretic particles 5 contained in the electrophoretic dispersion liquid 10 compose moveable particles.

The microcapsules 40 are arranged in parallel with one another lengthwise and crosswise between the counter substrate 11 and the base substrate 12 so as to form a single layer (arranged side by side without overlapping in the thickness direction).

As a constituent material of each capsule body (shell body) 401, for example, gelatin, a composite material of gum Arabic and gelatin, and various kinds of resin materials such as urethane-based resin, melamine-based resin, urea-based resin, epoxy-based resin, phenol-base resin, acryl-based resin, urethane-based resin, olefin-based resin, polyamide and polyester can be enumerated. One or more of them can be used independently or in combination.

Also, the capsule body 401 may be formed from a laminate of a plurality of layers. In this case, as a constituent material of the innermost layer, amino resin such as melamine-based resin and urea resin, and a composite material of the foregoing materials are preferably used. On the other hand, as a constituent material of the outermost layer, epoxy-based resin is preferably used.

Also, the constituent material of the capsule body 401 may have bridges (three-dimensional bridges) formed therein with a bridging agent. This makes it possible to maintain the flexibility of the capsule body 401, and improve its strength. As a result, the microcapsule 40 can be prevented from being readily collapsed.

It is preferred that the microcapsules 40 are formed such that their sizes are generally uniform. This ensures that occurrence of display variance in the electrophoretic display device 20 can be prevented or reduced, and more superior display performance can be exhibited.

Also, it is preferred that the microcapsules 40 are each present in a spherical shape. This provides the microcapsules 40 with excellent pressure resistance and excellent bleed resistance. Therefore, even when a shock is applied to the electrophoretic display device 20 or its display surface is pushed, while the electrophoretic display device 20 is operated in this manner or the electrophoretic display device 20 is stored, destruction of the microcapsules 40 and scattering of the electrophoretic dispersion liquid 10 can be prevented, and the device can be stably operated for an extended period of time.

It is noted that an average particle size of the microcapsules 40 is preferably in the range of about 5-50 μm, more preferably in the range of about 10-30 μm. By setting the average particle size of the microcapsules 40 to the aforementioned ranges, electrophoresis of the electrophoretic particles 5 in the electrophoretic display device 20 can be more securely controlled. In other words, even when electric fields in the form of pulses are applied to the electrophoretic particles 5, they can be reliably moved by electrophoresis to end portions within the microcapsules 40. As a result, the contrast in display can be increased.

The electrophoretic dispersion liquid 10 contained in the capsule body 401 is formed through dispersing (suspending) at least one type of electrophoretic particles 5 (two types of colored particles 5b and white particles 5a, in the present embodiment) in a liquid-phase dispersion medium 6.

A task of dispersing the electrophoretic particles 5 in the liquid-phase dispersion medium 6 can be performed by using one or a combination of two or more of, for example, a paint shaker method, a ball mill method, a media mill method, an ultrasonic dispersion method and a stirrer dispersion method.

A liquid-phase dispersion medium 6 that exhibits low solubility to the capsule body 401 and has relatively high insulation property is preferably used.

As the liquid-phase dispersion medium 6, it is possible to use, for example, waters (such as distilled water and purified water); alcohols such as methanol; cellosolves such as methyl cellosolve; esters such as methyl acetate; ketones such as acetone; aliphatic hydrocarbons (liquid paraffins) such as pentane; alicyclic hydrocarbons such as cyclohexane; aromatic hydrocarbons such as benzene; halogenated hydrocarbons such as methylene chloride; aromatic heterocycles such as pyridine; nitrites such as acetonitrile; amides such as N,N-dimethylformamide; carboxylic salts; various kinds of oils; and the like. One or more of them may be used independently or in combination.

Above all, as the liquid-phase dispersion medium 6, those containing aliphatic hydrocarbons (liquid paraffins) as a main ingredient are preferred. The liquid-phase dispersion medium 6 containing liquid paraffin as a main ingredient is preferred because of its high aggregation suppressing effect to the electrophoretic particles 5, and low affinity (low solubility) to the constituting material of the capsule bodies 401. By this, deterioration of the display performance of the electrophoretic display device 20 over time can be more reliably prevented or suppressed. Furthermore, the liquid paraffin is excellent in weather-resistance as it does not have unsaturated bonds, and also is preferable as it is highly safe.

Further, if necessary, various kinds of additives may be added to the liquid-phase dispersion medium 6 (electrophoretic dispersion liquid 10), such as, for example, a charge-controlling agent formed of particles of an electrolyte, a (anionic or cationic) surfactant such as alkenyl succinate, a metal soap, a resin material, a rubber material, an oil, a varnish or a compound; a dispersion agent such as a silane-based coupling agent; a lubricating agent; a stabilizing agent; and the like.

Further, when the liquid-phase dispersion medium 6 is to be colored, depending on the necessity, a pigment, such as, an anthraquinone-based pigment, an azo-based pigment, an indigoid-based pigment or the like may be dissolved in the liquid-phase dispersion medium 6.

The electrophoretic particles 5 are particles that are electrically charged and, are capable of electrophoretically moving in the liquid-phase dispersion medium 6, when electric fields act thereto.

The electrophoretic particles 5 may be any kind insofar as they have electric charges. Although not particularly limited, at least one of pigment particles, resin particles and composite particles thereof may be preferably used. These particles provide an advantage in that they are easy to produce, while assuring relatively easier control of electric charges.

As a pigment of which the pigment particles are made, for example, it is possible to use: a black pigment such as aniline black, carbon black, titanium black or the like; a white pigment such as titanium oxide, antimony oxide or the like; an azo-based pigment such as monoazo or the like; a yellow pigment such as isoindolinone, chrome yellow or the like; a red pigment such as quinacridone red, chrome vermilion or the like; a blue pigment such as phthalocyanine blue, indanthrene blue or the like; a green pigment such as phthalocyanine green; and the like. One or a combination of two or more of these pigments may be used.

Above all, when two types of different particles, such as, white particles 5a and black particles 5b as in the present embodiment are used, titanium oxide particles are favorably used as the white particles 5a, and titanium black particles are favorably used as the black particles 5b. These particles are highly responsive to electric fields, and have a great reflectance difference, which makes a high contrast display possible.

Also, as a resin material that composes the resin particles, examples, acryl-based resin, urethane-based resin, urea-based resin, epoxy-based resin, polystyrene, polyester and the like can be enumerated, and one type or a combination of two or more of these types may be used.

Also, as the composite particles, for example, particles produced by coating surfaces of pigment particles with a resin material or other pigment; particles produced by coating surfaces of resin particles with a pigment; and particles made of a mixture obtained by mixing a pigment and a resin material in a suitable composition ratio can be enumerated.

As the particles produced by coating the surfaces of the pigment particles with the other pigment, for example, particles obtained by coating surfaces of titanium oxide particles with silicon oxide or aluminum oxide can be exemplified.

Also, the shape of the electrophoretic particle 5 may preferably be spherical, without any particular limitation.

The electrophoretic particles 5 each having a relatively small size may preferably be used, in consideration of dispersability thereof in the liquid-phase dispersion medium 6. Concretely, an average particle size of them is preferably in the range of about 10-500 nm, and more preferably in the range of about 20-300 nm. By setting the average particle size of the adsorption particles 50 and the dispersion particles 5 to the aforementioned ranges, condensation of the electrophoretic particles 5 and precipitation thereof in the liquid-phase dispersion medium 6 can be reliably prevented, and thus can be dispersed in the liquid-phase dispersion medium 6. As a result, degradation in the display quality of the electrophoretic display device 20 can be favorably prevented.

It is noted that, if two different types of particles are used like the present embodiment, average grain sizes of the two types of grains may preferably be made different and, in particular, the average grain size of the white particles 5a may preferably be set greater than the average grain size of the black particles 5b. This makes it possible to improve the display contrast of the electrophoretic display device 20, and improve its retention property.

More concretely, it is preferred that the average grain size of the black particles 5b is set to about 20-100 nm, and the average grain size of the white particles 5a is set to about 150-300 nm.

Also, the specific gravity of the electrophoretic particles 5 may preferably be set generally equal to the specific gravity of the liquid-phase dispersion medium 6. By this, the electrophoretic particles 5 can stay at constant positions in the liquid-phase dispersion medium 6 for a long time, even after stopping the voltage application between the electrodes 3 and 4.

In other words, the electrophoretic display device 20 described above has a property (bistability) that can retain a display state at the time of voltage application between the electrodes 3 and 4, even after stopping the voltage application.

The electrophoretic display device 20 having such a property (bistability) can considerably reduce its power consumption because it needs to apply voltages between the electrodes 3 and 4 only at the time of switching displays. Furthermore, as the electrophoretic particles 5 stably move by electrophoresis, voltages can be applied in various patterns, such as, bit by bit application of voltages, and the like, whereby electrophoretic movements of the electrophoretic particles 5 can be controlled in more complex manners. Therefore, a method of displaying the display device in accordance with the invention to be described in detail below is favorably applied.

The binder 41 is provided for the purpose of, for example, bonding the counter substrate 11 and the substrate 12 together, fixing the microcapsules 40 between the counter substrate 11 and the substrate 12 in place, assuring insulation between the first electrodes 3 and the second electrode 4, and the like. This makes it possible to further improve durability and reliability of the electrophoretic display device 20.

A resin material that exhibits high affinity with (coherency with) the respective electrodes 3 and 4 and the capsule bodies 401 (of the microcapsules 40) and has excellent insulation performance (which is insulating or only allows micro current to flow) may preferably be used as the binder 41.

As the binder 41, for example, various resin materials can be enumerated, including a thermoplastic resin, such as, polyethylene, polypropylene, ABS resin, ester methacrylate resin, methyl methacrylate resin, vinyl chloride resin or cellulose-based resin; silicone-based resin; urethane-based resin; and the like. One or more of these types may be used independently or in combination.

In this embodiment, the electrophoretic display sheet 21 and the circuit board 22 are bonded together by means of the adhesive agent layer 8. By this, the electrophoretic display sheet 21 and the circuit board 22 can be more reliably fixed together.

This adhesive agent layer 8 may preferably have, in addition to the function of bonding (fixing) the electrophoretic display sheet 21 and the circuit board 22, other functions of I; providing insulation, II; preventing dispersion of ions from the electrophoretic display sheet 21 to the circuit board 22, and III; alleviating stress that is generated at the time of bonding the electrophoretic display sheet 21 and the circuit board 22.

Because of the function I, short-circuit between the first electrode 3 and the second electrode 4 can be reliably prevented, and electric fields can be reliably acted on the electrophoretic particles 5.

Because of the function II, deterioration of the characteristic of the circuit (switching elements in particular) provided in the circuit board 22 can be prevented or suppressed.

Also, because of the function III, destruction of the microcapsules 40 and the switching elements provided in the circuit board 22 at the time of manufacturing (forming) the electrophoretic display device 20 can be prevented. In particular, in accordance with the present invention, the microcapsules 40 and the adhesive agent layer 8 are in point contact with one another, so that, by providing the adhesive layer 8 with the function III, the microcapsules 40 can be prevented from being subject to excessive pressure, and the microcapsules 40 can be accurately prevented or suppressed from becoming to be non-spherical.

It is preferred that the adhesive agent layer 8 is mainly constituted of polyurethane. Polyurethane is preferred as it can reliably add the various functions described above to the adhesive layer 8.

As the constituent material of the adhesive agent layer 8, instead of polyurethane, various resin materials, such as, for example, polyethylene, chlorinated polyethylene, ABS resin, vinyl acrylate ester copolymer, fluorine-based resin or silicone-based resin, and the like can be enumerated. One or more of these materials may be used independently or in combination.

Moreover, the sealing part 7 is provided between the base portion 1 and the base portion 2, and along peripheral edges thereof. The electrodes 3 and 4, the microcapsule-containing layer 400, and the adhesive agent layer 8 are air-tightly sealed by the sealing part 7. This makes it possible to prevent moisture from penetrating the electrophoretic display device 20, whereby deterioration of display performance of the electrophoretic display device 20 can be more securely prevented.

As a constituent material of the sealing part 7, various kinds of resin materials can be enumerated, including, for example, a thermoplastic resin such as acryl-based resin, urethane-based resin and olefin-based resin; a thermosetting resin such as epoxy-based resin, melamine-based resin and phenol-based resin; and the like. One or more of these resin materials may be used independently or in combination.

It is noted that the sealing part 7 may be provided depending on the necessity, or may be omitted.

Also, as described above, the counter substrate 11 has the circuit 30 for applying a voltage between the first electrode 3 and the second electrode 4.

The circuit 30 has, as shown in FIG. 2, switching sections 31 provided corresponding to the plurality of first electrodes 3, first wirings (data lines) 34 for applying voltages to the respective switching sections 31, and second wirings (scanning lines) 35 for selecting ON or OFF of the switching sections 31.

The switching sections 31 are provided independently for the plural first electrodes 3, and serve as a switching circuit for applying electric fields to the microcapsules 40 (the electrophoretic particles 5) disposed between the first electrode 3 and the second electrode 4. For this reason, the switching sections 31 are arranged in a matrix configuration (a configuration of rows and columns), like the first electrodes (independent electrodes) 3.

Each of the switching sections 31 has, in accordance with the present embodiment, a voltage application switching element 32 like a thin film transistor (TFT), and a capacitor element (a capacitor) 33.

The voltage application switching element 32 has a gate electrode, a source electrode and a drain electrode, wherein, in each switching section 31, the source electrode is electrically connected to the first wiring 34, the gate electrode to the second wiring 35, and the drain electrode to the first electrode 3 and the capacitance element 33.

For this reason, when the voltage application switching element 32 is turned on by application of a voltage to the second wiring 35, a voltage applied to the first wiring 34 can be applied to both of the first electrode 3 and the capacitance element 33 through the voltage application switching element 32.

Therefore, by applying a voltage to any of the second wirings 35 that are arranged in plurality in rows, and applying a voltage at an arbitrary magnitude to the first wiring 34 that are arranged in plurality in columns, the voltage at the desired magnitude can be applied to both of the first electrodes 3 and the capacitance elements 33 at desired locations.

The capacitance element 33 is electrically connected to both of the first electrode 3 and the second electrode 4 in parallel with the paring electrodes 3 and 4, and connected to the drain electrode of the voltage application switching element 32.

With such a structure, when the voltage application switching element 32 is turned to ON state, the first wiring 34 and one terminal of the capacitance element 33 becomes conductive, and an electric charge is charged in the capacitance element 33. On the other hand, when the voltage application switching element 32 is turned to OFF state, the first wiring 34 and the one terminal of the capacitance element 33 becomes non-conductive; but if the electric charge is charged in the capacitance element 33, the voltage continues to be applied across the pair of the electrodes 3 and 4 by the electric charge stored in the capacitance element 33.

The first wirings 34 are arranged in plurality in columns, wherein the first wiring 34 in each column is connected to a plurality of the drain electrodes of the voltage application switching elements 32 corresponding to each of the first wirings 34.

Also, one end section of the first wiring 34 may be connected to an unshown switching element of a voltage application device, wherein, by switching with the switching element, 0 potential, + potential or − potential can be selected, such that a desired voltage can be applied.

The second wirings 35 are arranged in plurality in rows, wherein the second wiring 35 in each row is connected to a plurality of the gate electrodes of the voltage application switching elements 32 corresponding to each of the second wirings 35. By applying a voltage to any of the plural second wirings 35, the voltage application switching element 32 connected to each of the selected second wirings 35 is turned ON, whereby the first wiring 34 can be brought to a conductive state with the capacitance element 33 and the first electrode 3.

The electrophoretic display device 20 is capable of operation according to the following functioning (operation) method.

As the electrophoretic display device 20 in accordance with the present embodiment has the counter substrate 11 that is equipped with the circuit 30 having the structure described above, by selecting a combination of suitable ones of the first wirings 34 and the second wirings 35 to which a voltage is applied, the switching sections 31 (the voltage application switching elements 32) at desired positions can be turned on, whereby a voltage with a desired magnitude can be applied to the first electrodes 3 and the capacitance elements 33 at the desired positions.

In this manner, at those of the first electrodes to which a voltage is applied, a potential difference is generated between the first electrode 3 and the third electrode 4, causing an electric filed to be generated between the electrodes 3 and 4. This makes the electrophoretic particles 5 (the black particles 5b, the white particles 5a) to electrophoretically move toward either of the electrodes. As a result, the reflection light that can be seen through the display surface changes, whereby the display color can be switched (a display switched state).

More concretely, for example, in the case where the white particles 5a that are positively charged and the black particles (colored particles) 5b that are negatively charged are used, the white particles 5a move toward the first electrode 3 when an electrical voltage is applied between the electrodes 3 and 4 in a manner that the first electrode 3 has a negative potential. On the other hand, the black particles 5b move toward the second electrode 4. As a result, as viewed from the side of the display surface (the base portion 2), the black particles 5b are visible, which displays a black color.

In reverse, when an electrical voltage is applied between the electrodes 3 and 4 in a manner that the first electrode 3 has a positive potential, the white particles 5a move toward the second electrode 4. On the other hand, the black particles 5b move toward the first electrode 3. As a result, as viewed from the side of the display surface (the base portion 2), the white particles 5a are visible, which displays a white color.

In view of the above, by putting the switching sections 31 at arbitrary positions in ON state, and applying a voltage between the electrodes 3 and 4 to cause the first electrodes 3 to have a positive potential or a negative potential, the displayed color can be switched as a black display or a white display according to a shape of the first electrodes at the arbitrary positions, whereby the electrophoretic display device 20 can display a desired image.

It is noted that, in the electrophoretic display device 20, as described above, the switching section 31 has the capacitor element (a capacitor) 33 connected in parallel to the paring electrodes (a pair of electrodes) 3 and 4.

Therefore, when the switching section 31 (the voltage application switching element 32) is turned on, a voltage is applied to the first electrode 3 by the voltage application device, and the voltage is also applied to the capacitance element 33. As a result, an electric charge is charged in the capacitance element 33 (a first state to be described below). Therefore, even after the switching section 31 has been turned off, the voltage can be applied between the electrodes 3 and 4 by discharging of the electric charge stored in the capacitance element 33, whereby the electrophoretic particles 5 (the white particles 5a, the black particles 5b) can be continuously moved toward the electrodes (a second state to be described below). As a result, the time for keeping the switching section 31 in ON state can be shortened, and other switching sections 31 can be turned on earlier, such that the electrophoretic display device 20 is capable of displaying images (screen display) at high speed.

However, the electrophoretic display device 20 having such a structure entails a problem in that, as described above, the contrast of each color may lower due to lowering of the reflectance of a white color or a black color.

As a result of keen examination in view of such a problem, the inventor has come to understand that the lowered reflectance of a white color or a black color of the electrophoretic display device 20 was caused by the following factors.

Namely, as the electrophoretic particles 5 contained in the microcapsules 40 have a high dielectric constant, and thus have induced polarization caused by electric fields generated between the electrodes 3 and 4, whereby relatively positive portion and negative portion are generated within each electrophoretic particle 5. As a result, when electrophoretic particles 5 of multiple colors, such as, the white particles 5a and the black particles 5b, are contained in each of the microcapsules 40, like the present embodiment, it has become clearer that the white particles 5a and the black particles 5b are bonded together, such that the white electrophoretic particles would be mixed in at the time of black display, or the black electrophoretic particles would be mixed in at the time of white display.

Moreover, as a result of further examination, the inventor discovered the reason why relatively positive portion and negative portion were generated within each electrophoretic particle 5 as a result of the fact that the electrophoretic particles 5 had induced polarization caused by electric fields generated between the electrodes 3 and 4. This is because, when the electrophoretic particles 5 are electrophoretically moved to cause a black color display or a white color display, a voltage is continuously applied between the electrodes 3 and 4 by the voltage application device connected to the first wiring 34 or by discharging of the electric charge stored in the capacitance element (capacitance) 33.

Therefore, when the electrophoretic particles are moved (electrophoretically moved) for switching the display color (to a black color display or a white color display in the present embodiment), it was found that the problem described above could be solved by setting a state (a third state to be described below) in which no voltage is applied between the electrodes 3 and 4, and the electric charge stored in the capacitor element 33 is discharged, in other words, by setting a state in which the potential difference between the first electrode 3 and the second electrode 4 is brought to generally 0.

Here, for the purpose of discriminating the states from one to the other in which the voltage is applied between the electrodes 3 and 4 described above, the state in which the switching element of the voltage application device sets the voltage to be applied to the voltage application switching element 32 to + potential or − potential, and the voltage application switching element 32 is turned on by applying a voltage to the second wiring (the scanning line) 35, such that a voltage is applied across the electrodes 3 and 4 and an electric charge is charged in the capacitance element 33 is referred to as a first state in the present specification.

Also, the state in which voltage application to the second wiring 35 is stopped to set the voltage application switching element 32 in OFF state, and a voltage is applied across the electrodes 3 and 4 by discharging of the electric charge stored in the capacitance element 33 is referred to as a second state (a high impedance state).

Furthermore, the state in which a voltage is not applied between the first electrode 3 and the second electrode 4, and the electric charge stored in the capacitance element 33 is discharged is referred to as a third state (a low impedance state).

Also, the voltage that is applied between the electrodes 3 and 4 by the voltage application device or by discharging of the electric charge stored in the capacitance element 33 is referred to as an "effective voltage."

Defining the states of voltage application between the electrodes 3 and 4 as described above, the conventional art performs display color switching through repeating multiple times the first state in which the effective voltage is applied between the electrodes 3 and 4 by the voltage application device, and intervals between the first states are set to the second state in which the effective voltage is applied between the electrodes 3 and 4 by discharging of the electric charge stored in the capacitance element 33. However, according to the present invention, it was found that the aforementioned problem could be solved through setting at least one of the second states to the third state in which the voltage (effective voltage) is not applied between the first electrode 3 and the second electrode 4, and the electric charge stored in the capacitance element 33 is discharged, whereby the present invention was brought to a completion.

In other words, it was found that, when the display color is to be switched, by providing a composition in which intervals among the first states that are repeated are set to have both the second state and the third state, the problem described above could be solved, and the present invention was thus brought to a completion.

When the display color is switched by the method of driving the electrophoretic display device described above, bonds between the white particles 5a and the black particles 5b can be cut, and mixing of the white particles 5a upon a black color display or mixing of the black particles 5b upon a white color display can be accurately suppressed or prevented, such that lowering of the contrast of each color, which is caused by a reduction in the reflectance of white color or black color, can be reliably suppressed.

Here, in the electrophoretic display device 20 in accordance with the present embodiment, in order to set the third state in which, when the electrophoretic particles 5 are moved by electrophoresis, the voltage (effective voltage) is not applied between the first electrode 3 and the second electrode 4, and the electric charge stored in the capacitance element 33 is discharged, for example, while the voltage application switching element 32 is kept in ON state, the switching element of the voltage application device is operated from the state in which + potential or − potential is applied to the voltage application switching element 32 to the state in which 0 potential is applied thereto, and then the voltage application switching element 32 is turned to OFF state. By this, the electric charge stored in the capacitance element 33, which is connected to the voltage application switching element 32, is discharged through the voltage application switching element 32, such that the potential on the electrode 3 becomes to be generally 0, and the effective voltage is not applied between the first electrode 3 and the second electrode 4, thereby setting the third state.

For switching the display color to a white color display or to a black color display by operating the electrophoretic display device 20, as described above, through setting the voltage to be applied between the first electrode 3 and the second electrode 4 to the first state, the second state or the third state, specifically, the effective voltage is applied between the electrodes 3 and 4 in a manner as shown in FIG. 3.

It is noted that, in FIG. 3, the magnitude of the effective voltage to be applied to the first electrode 3 in this instance is V1. Also, in the following description, switching of the display of the electrophoretic display device 20 shall be described, referring to an example in which a black color display is changed to a white color display.

<1> First, as shown in FIG. 3, by applying a voltage to the second wiring 35 in a state in which the voltage V1 is applied to the first wiring 34, the voltage application switching element 32 is set to ON state thereby setting the first state and, thereafter by stopping the application of the voltage to the second wiring 35, the voltage application switching element 32 is set to OFF state, thereby setting the second state (the first stage).

By this, as a potential difference is created between the first electrode 3 and the second electrode 4, an electric field is generated between the electrodes 3 and 4, which causes the white particles 5a to separate away from the first electrode 3 and start electrophoretically moving (migrating) toward the second electrode 4, and causes the black particles 5b to separate away from the second electrode 4 and start electrophoretically moving (migrating) toward the first electrode 3 (see FIG. 4 (a)).

It is noted that, when the second state is set, the effective voltage V1 gradually lowers due to discharging of the capacitance element 33. Therefore, depending on the necessity, the operation (the first stage) in which the second state is set after the first state may preferably be repeated multiple times (two times in FIG. 3). By this, each of the electrophoretic particles 5 can be reliably separated from the electrode 3 or 4, and reliably moved by electrophoresis toward the opposing electrode 3 or 4.

The number of repetitions of the operation (the first stage) of setting the second state after setting the first state is not particularly limited, but may preferably be about 2-20 times, and more preferably be 2-10 times. By this, the effects described above can be more significantly exhibited.

Also, the magnitude of the effective voltage V1 to be applied to the first electrode 3 may somewhat differ according to the kinds of the electrophoretic particles 5 and, without any particular limitation, may preferably be about 3-25 V, and more preferably about 6-20 V. By this, an electric field is generated between the electrodes 3 and 4, whereby the electrophoretic particles 5 can be reliably moved.

<2> Next, as shown in FIG. 3, by applying a voltage to the second wiring 35, the voltage application switching element 32 is set to ON state thereby setting the first state and then, while maintaining the ON state of the voltage application switching element 32, the voltage applied to the voltage application switching element 32 is changed to 0 potential. Then, by setting the voltage application switching element 32 to OFF state, thereby setting the second state (the second stage).

By this, when the first state is set, an electrical field is generated between the electrodes 3 and 4, whereby the electrophoretic particles 5 would electrophoretically move within the microcapsule 40. When the second state is set, there is no potential difference between the electrodes 3 and 4, whereby the electric field between the electrodes 3 and 4 disappear. For this reason, the induced polarization caused by the electric field generated between the electrodes 3 and 4 within the electrophoretic particles 5 are released, whereby generation of relatively positive portion and negative portion within each of the electrophoretic particle 5 can be reliably prevented. As a result, even if bonds are generated between the white particles 5a and the black particles 5b, such bonds can be cut off, and the white particles 5a and the black particles 5b can be reliably prevented from newly bonding together near the center of the microcapsule 40 (see FIG. 4 (b)).

It is noted that, when the third state is set, electrolyte disappears between the electrodes 3 and 4, the operation (the second stage) of setting the second state after setting the first state may preferably be repeated multiple times (two times in FIG. 3), within the range that the electrophoretic particles 5 do not have induced polarization. By this, generation of bonding between the white particles 5a and the black particles 5b can be prevented, and the electrophoretic particles 5 can be reliably moved by electrophoresis toward the opposing electrodes 3, 4.

It is noted that the number of repetitions of the operation (the second stage) of setting the third state after setting the first state may preferably be, without any particular limitation, about 2-15 times, and more preferably about 2-8 times. By this, the effects described above can be exhibited more significantly.

<3> Next, as shown in FIG. 3, by applying a voltage to the second wiring 35 again, the voltage application switching element 32 is set to ON state thereby setting the first state and, then, the voltage application to the second wiring 35 is stopped, whereby the voltage application switching element 32 is set to OFF state thereby setting the second state (the third stage).

By this, a white color display, as shown in FIG. 4 (c), can be obtained.

When the second state is set after the first state, the application between the electrodes 3 and 4 continues in the second state and therefore the particles continue moving by electrophoresis. However, as the induced polarization of the particles continues occurring even in the second state, bonds between the white particles 5a and the black particles 5b cannot be cancelled. On the other hand, when the third state is set after the first state, the particles do not move by electrophoresis as no application is given between the electrodes 3 and 4 in the third state. At the same time, the induced polarization is cancelled such that the bonding between the white particles 5a and the black particles 5b is cancelled. When the first state is set next to the third state, it takes longer for the particles to have induced polarization than to start electrophoretic movement, such that the white particles and the black particles are separated from one another.

It is noted that the number of repetitions of the operation (the third stage) of setting the second state after setting the first state may preferably be, without any particular limitation, about 2-10 times, and more preferably about 2-4 times. By this, the effects described above can be exhibited more significantly.

Also, in the steps <1>-<3>, the time t1 to keep the first state may preferably be, without any particular limitation, about 1-300 msec, and more preferably about 5-100 msec. This assures that an electric charge is reliably stored in the capacitance element 33, and the electrophoretic particles 5 can be reliably moved by electrophoresis.

The time t2 to keep the second state may preferably be, without any particular limitation, about 10-500 msec, and more preferably about 50-300 msec. This assures that the voltage can be prevented from being extremely lowered through discharging of the electric charge stored in the capacitance element 33, and the electrophoretic particles 5 can be reliably moved by electrophoresis.

Furthermore, the time t3 to keep the third state may preferably be, without any particular limitation, about 10-500 msec, and more preferably about 50-300 msec. This assures that generation of relatively positive portion and negative portion within each electrophoretic particle 5 can be more reliably prevented, and the electrophoretic display device 20 can realize high-speed image display.

By the method of driving a display device in accordance with the present invention, as described above, display colors can be switched.

According to the method of driving a display device described above, the capacitance element 33 is connected in parallel with the pair of electrodes 3 and 4, such that the time of turning on each of the voltage application switching elements 32 can be shortened, and other ones of the voltage application switching elements 32 can be turned on quickly, whereby high-speed image display of the electrophoretic display device 20 becomes possible. Furthermore, when the electrophoretic particles 5 electrophoretically move within the microcapsules 40, the potential difference between the pair of electrodes 3 and 4 becomes generally uniform as the third state, whereby lowering of the contrast of each color, caused by bonding of the white particles 5a and the black particles 5b, can be accurately suppressed or prevented.

The electrophoretic display device 20 described above can be manufactured as follows.

Hereinbelow, a method of manufacturing the electrophoretic display device 20 will be described.

The method of manufacturing the electrophoretic display device 20 includes a microcapsule production step [1] for producing the microcapsules 40, a microcapsule dispersion liquid preparation step [2] for preparing a microcapsule dispersion liquid containing the microcapsules 40, a microcapsule-containing layer formation step [3] for forming the microcapsule-containing layer containing the microcapsules 40 on one surface of the base substrate 12, an adhesive agent layer forming step [4] for forming an adhesive agent layer 8 on a surface of the microcapsule-containing layer 400 on the opposite side of the base substrate 12, a bonding step [5] for bonding the adhesive agent layer 8 and the counter substrate 11 by bringing the counter substrate 11 into contact with a surface of the adhesive agent layer 8 on the opposite side of the microcapsule-containing layer 400, and a sealing step [6] for forming the sealing portion 7 along circumferential portions of the base section 1 and the base section 2.

Hereinbelow, each of the steps will be described.

[1] Step of Producing Microcapsules

The method of producing the microcapsules 40 (a method of encapsulating the electrophoretic dispersion liquid 10 into the capsule body 401) is not particularly limited to a specific type, and various microcapsule production methods can be used, including, for example, an interfacial polymerization method, an in-situ polymerization method, a phase separation method (or a coacervation method), an interfacial sedimentation method and a spray drying method. These microcapsule production methods may suitably be selected depending on the constituent material or the like of the microcapsules 40.

Also, the microcapsules 40 having a uniform size can be obtained by using, e.g., a sieving method, a filtering method or a specific gravity difference sorting method.

[2] Microcapsule Dispersion Liquid Preparation Step

Next, the binder 41 is prepared, and then this binder 41 is mixed with the microcapsules 40 produced in the step [1] to thereby prepare microcapsule dispersion liquid.

The amount of the microcapsules 40 contained in the microcapsule dispersion liquid is preferably in the range of about 30-60 wt %, and more preferably in the range of about 40-60 wt %.

If the amount of the microcapsules 40 is set to fall within the above-noted range, there is provided a great advantage in that the microcapsules 40 can be moved (or rearranged) within the microcapsule-containing layer 400 in such a manner as not to overlap one another in a thickness direction thereof (in a single layer).

[3] Step of Forming Microcapsule-containing Layer

Next, the base substrate 12 is prepared. Then, the microcapsule dispersion liquid prepared in the above-described step [2] is supplied onto the base substrate 12.

Depending on the necessity, the microcapsule dispersion liquid is leveled so that a thickness (a quantity) thereof becomes uniform across the base substrate 12 at any portion thereof, preferably leveled so that the microcapsules 40 can be arranged side by side (in a single layer) without overlapping one another in a thickness direction.

[4] Step of Forming Adhesive Agent Layer

Next, the adhesive agent layer 8 is formed on the microcapsule-containing layer 400.

[5] Bonding Step

Next, the circuit board 22 that has been independently prepared is superposed on the adhesive agent layer 8 in a manner that the first electrode 3 comes in contact with the adhesive agent layer 8.

By this, the electrophoretic display sheet 21 and the circuit board 22 are bonded together through the adhesive agent layer 8.

At this time, an arrangement density of the microcapsules 40 in the microcapsule-containing layer 400 can be made uniform due to the weight of each of the adhesive agent layer 8 and the circuit board 22 or by pressing the circuit board 22 and the electrophoretic display sheet 21 toward each other (by reducing the thickness of the microcapsule-containing layer 400).

[6] Sealing Step

Next, the sealing portion 7 is formed along the edges of the electrophoretic display sheet 21 and the circuit board 22.

This can be formed by supplying a material for forming the sealing portion 7 between the electrophoretic display sheet 21 (the base portion 2) and the circuit board 22 (the base portion 1) along the edges thereof, using, for example, a dispenser, and then solidifying or curing the material. The electrophoretic display device 20 is obtained through the steps described above.

<<Second Embodiment>>

Next, a second embodiment of the electrophoretic display device that uses the method of driving a display device in accordance with the present invention will be described.

Figure 5:
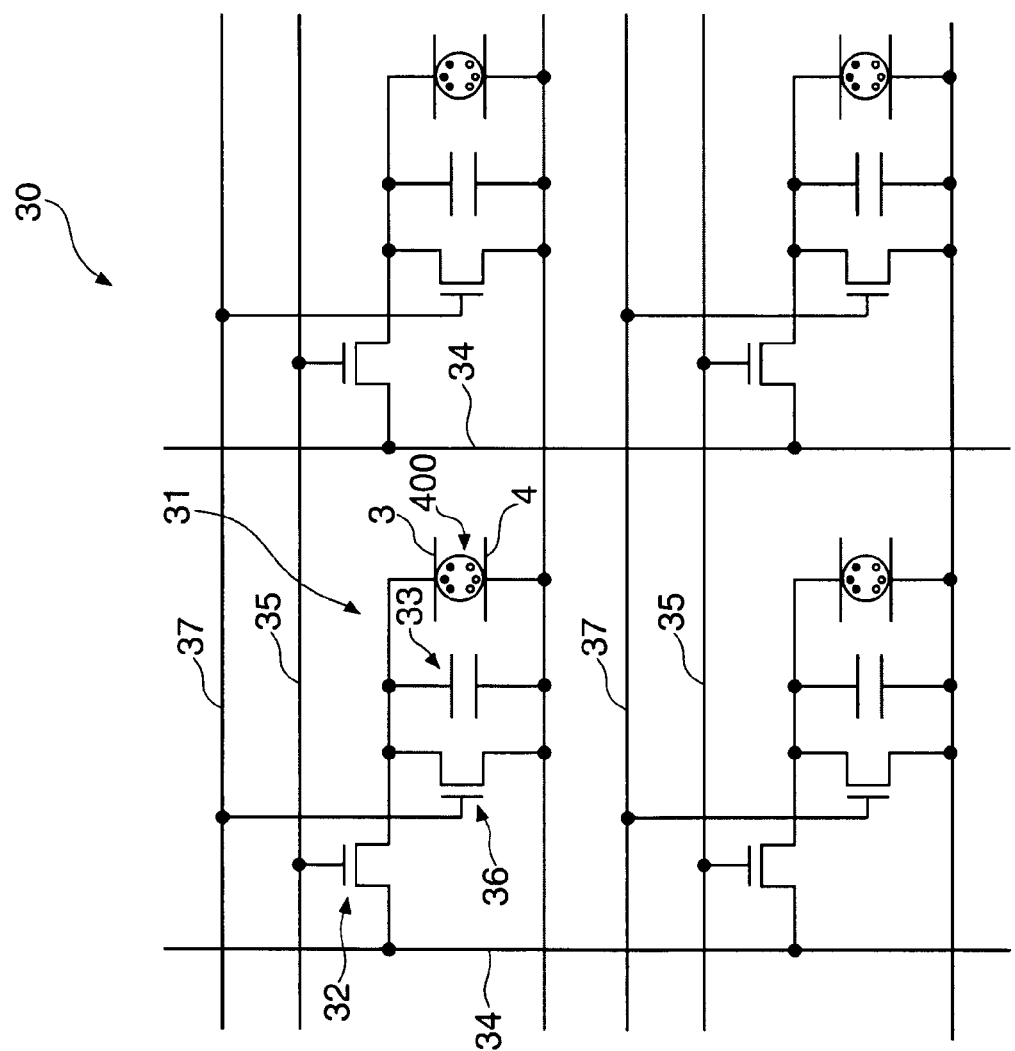
FIG. 5 is a schematic diagram of the structure of a driving circuit of an electrophoretic display device in accordance with a second embodiment.
Figure 6:
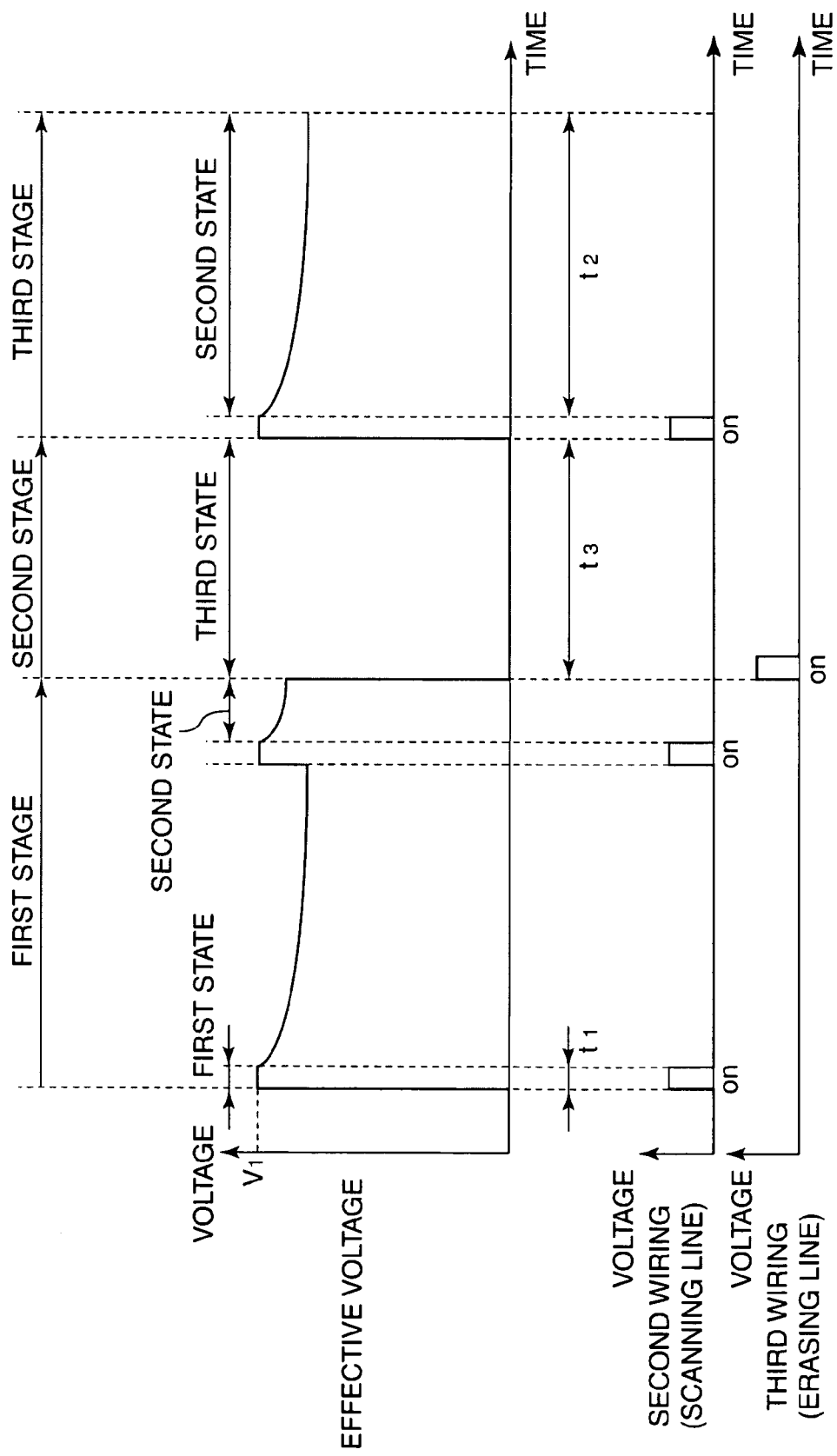
FIG. 6 is a chart (a timing chart) showing the voltage to be applied between a pair of electrodes and the timing to turn ON and OFF of a voltage application switching element and an erasing switching element.

FIG. 5 is a schematic diagram of the structure of a driving circuit of an electrophoretic display device in accordance with a second embodiment. FIG. 6 is a chart (a timing chart) showing the voltage to be applied between a pair of electrodes and the timing to turn ON and OFF of a voltage application switching element and an erasing switching element.

Hereinbelow, the electrophoretic display device in accordance with the second embodiment will be described, with emphasis placed on its differences from the first embodiment, and description of similar features will be omitted.

The electrophoretic display device 20 in accordance with the second embodiment has a similar structure as that of the electrophoretic display device 20 of the first embodiment, except that the circuit 30 is different. It is noted that its compositions similar to that of the above-described first embodiment are appended with the same reference numbers.

More specifically, the circuit 30 of the electrophoretic display device 20 of the present embodiment has, in addition to the structure of the circuit 30 of the electrophoretic display device 20 of the first embodiment, a structure similar to that of the electrophoretic display device 20 of the first embodiment except that, as shown in FIG. 5, each of the switching sections 31 is equipped with an erasing switching element 36 that is electrically connected to the capacitance element 33, and a plurality of third wirings 37 are additionally provided in rows.

The erasing switching element 36 has a gate electrode, a source electrode and a drain electrode. In each of the switching sections 31, the gate electrode is connected to the third wiring 37, and the source electrode and the drain electrode are electrically connected to one end terminal and the other end terminal of the capacitance element 33, respectively.

Therefore, when the erasing switching element 36 is turned on by applying a voltage to the third wiring 37, the both terminals of the capacitance element 33 are connected together through the erasing switching element 36.

Accordingly, by turning on the erasing switching element 36 when the voltage application switching element 32 is in OFF state, and in the second state in which an effective voltage is applied to the first electrode 3 through discharging of the electric charge stored in the capacitance element 33, the terminals of the capacitance element 33 are connected to each other, such that the electric charge stored in the capacitance element 33 is almost completely discharged, and therefore the third state in which no voltage is applied between the first electrode 3 and the second electrode 4 can be set.

The third wirings 37 are arranged in rows in plurality generally in parallel with the second wirings 35, and the third wiring 37 in each of the rows is connected to the gate electrodes of the erasing switching elements 36 in plurality corresponding to each of the respective third wirings 37. By applying a voltage to any of the plurality of third wirings 37, the erasing switching elements 36 connected to that third wiring 37 can be put to ON state, thereby setting a state in which the terminals of the capacitance element 33 are connected to each other (a conductive state).

It is noted that the second wirings 35 and the third wirings 37 are connected to unshown independent voltage application devices, respectively, and voltages can be applied to the second wirings 35 and the third wirings 37 at arbitrary positions independently from one another, whereby the erasing switching elements 36 at desired positions can be turned to ON state, independently of the voltage application switching elements 32.

The electrophoretic display device 20 of the present embodiment equipped with such a circuit 30 can be operated according to the following functioning (operation) method.

<1> First, like the step <1> described above, as shown in FIG. 6, after setting the first state, the second state is set (the first stage).

<2'> Then, like the step <1> described above, after setting the first state, the second state is once set.

Then, while keeping this second state, in other words, while the effective voltage is applied between the electrodes 3 and 4 through discharging of the electric charge stored in the capacitance element 33, the erasing switching element 36 is turned ON. This set a state in which the terminals of the capacitor element 33 are connected to each other, such that the electric charge stored in the capacitor element 33 is almost completely discharged, whereby the third state in which no voltage is applied between the first electrode 3 and the second electrode 4 can be set (the second stage).

In this manner, as the erasing switching elements 36 equipped with such a structure in accordance with the present embodiment is provided, the third state can be set simply by turning the erasing switching element 36 to ON state in the second state. In other words, the operation of setting the third state can be readily conducted.

<3'> Next, like the step <3> described above, as shown in FIG. 6, after setting the first state, the second state is set again (the third stage).

This makes it possible to switch the display color.

By the method of driving a display device in accordance with the present embodiment described above, it is possible to obtain actions and effects similar to those of the method of driving a display device in accordance with the invention described above with reference to the first embodiment.

<<Third Embodiment>>

Next, a third embodiment of the electrophoretic display device that uses the method of driving a display device in accordance with the invention will be described.

Figure 7:
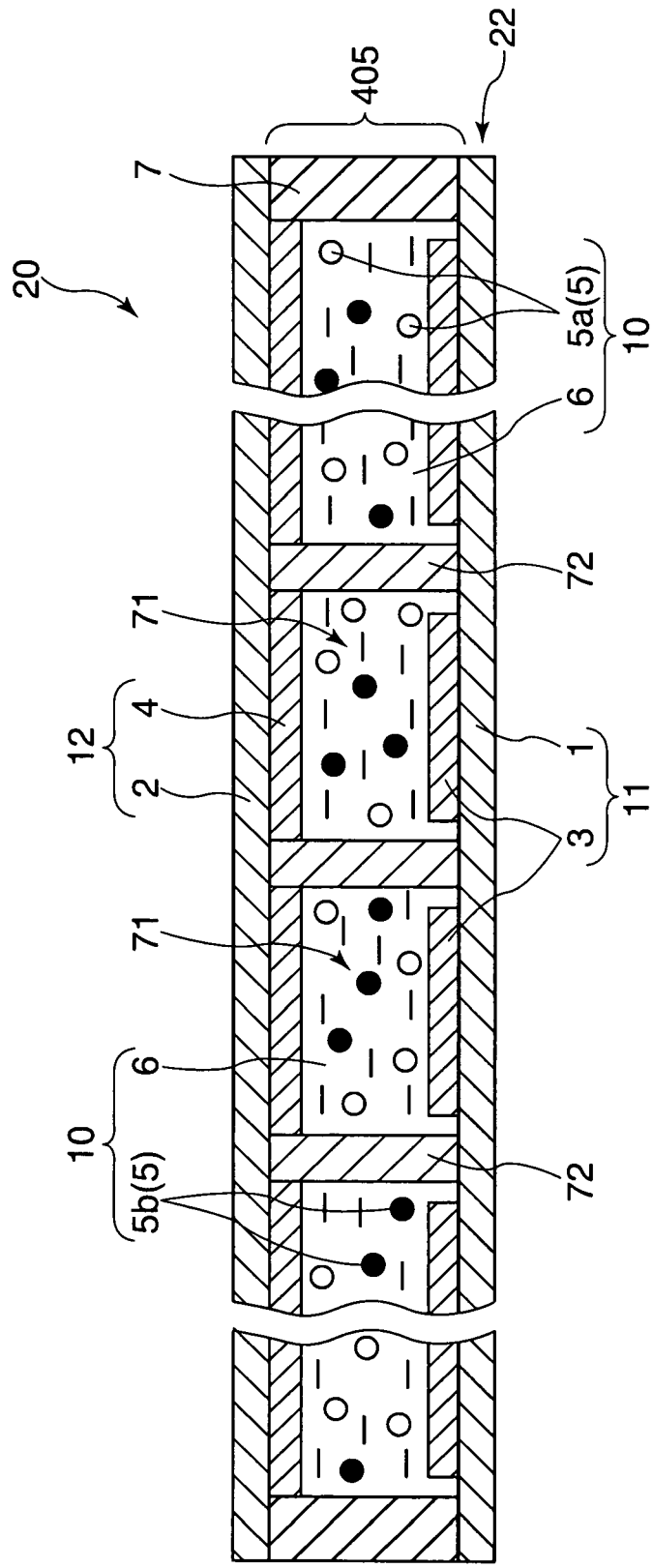
FIG. 7 is a view schematically showing a vertical cross section of a third embodiment of an electrophoretic display device to which the driving method of the invention is applied.

FIG. 7 is a view schematically showing a vertical cross section of the third embodiment of an electrophoretic display device to which the driving method of the invention is applied.

It is noted that, herein below, description shall be made with the upper side in FIG. 7 being referred to as "upper" and the lower side being referred to as "lower" for the sake of convenience in description.

Hereinafter, an electrophoretic display device in accordance with the third embodiment will be described, with emphasis placed on its differences from the electrophoretic display devices of the first and second embodiments, and description of similar aspects will be omitted.

An electrophoretic display device 20 shown in FIG. 7 is similar to the electrophoretic display devices 20 in accordance with the first embodiment and the second embodiment except that, instead of the microcapsule-containing layer 400 composed of the microcapsules 40 and the binder 41, there is provided a sealed section 405 that has partition walls 72 provided between individual electrodes of the first electrodes 3 divided in a matrix configuration and defining closed spaces 71, and electrophoretic dispersion liquid 10 contained in the closed spaces 71.

In other words, the present embodiment is similar to the electrophoretic display devices 20 of the first and second embodiments except that the display section is composed of the sealed section 405, instead of the microcapsule-containing layer 400.

The method of driving a display device in accordance with the present invention described above in the first and second embodiments is also applied to the electrophoretic display device 20 of the present embodiment with such a structure, and actions and effects similar to those describe above can be obtained.

<Electron Particle Flowing Type Display Device>

Next, a case in which the method of driving a display device in accordance with the present invention is applied to an electron particle flowing type display device will be described.

Figure 8:
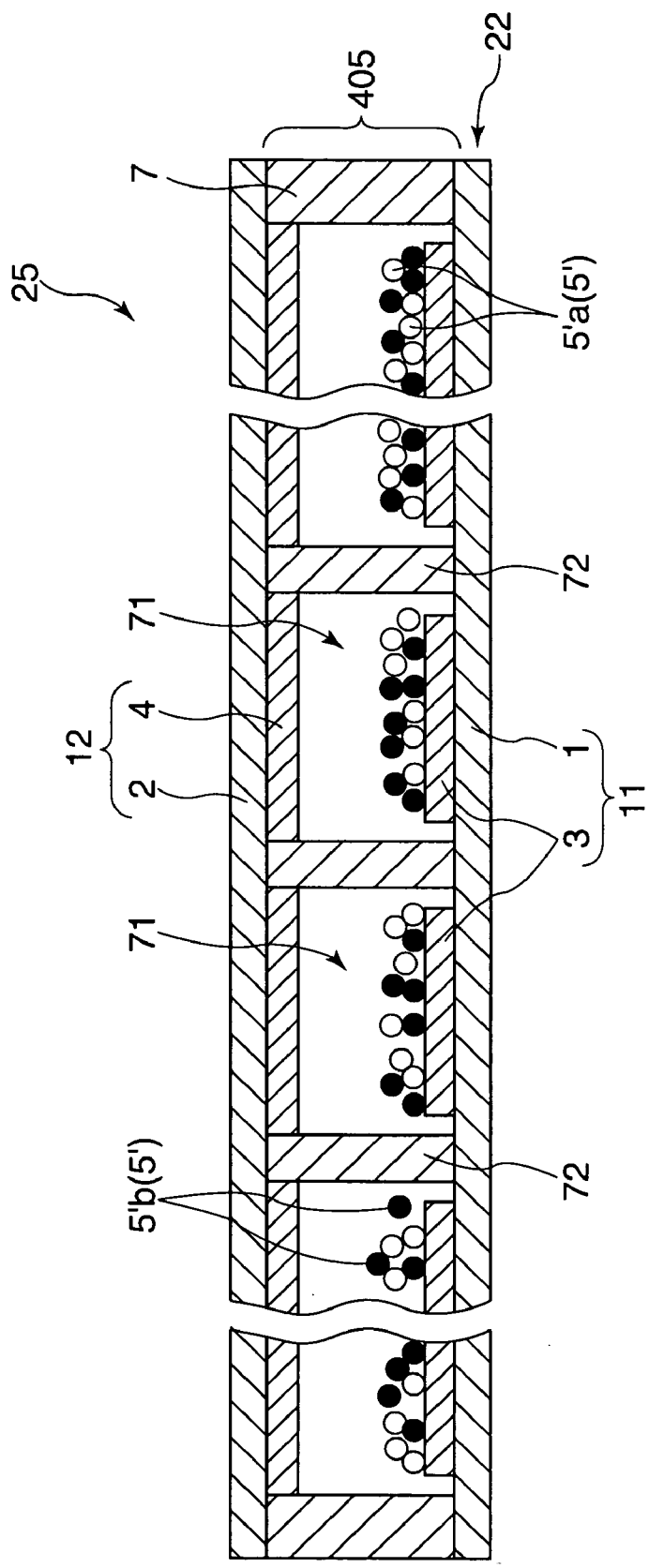
FIG. 8 is a view schematically showing a vertical cross section of an embodiment of an electron particle flowing type display device to which the driving method of the invention is applied.

FIG. 8 is a view schematically showing a vertical cross section of an embodiment of an electron particle flowing type display device to which the driving method of the invention is applied. It is noted that, hereinafter, description shall be made with the upper side in FIG. 8 being referred to as "upper" and the lower side being referred to as "lower" for the sake of convenience in description.

Hereinbelow, the electron particle flowing type display device will be described, with emphasis placed on differences from the electrophoretic display devices of the first~third embodiments described above, and description of similar aspects will be omitted.

An electron particle flowing type display device 25 shown in FIG. 8 is similar to the electrophoretic display device 20 of the third embodiment described above except that the closed spaces 71 provided between the individual electrodes of the first electrode 3 and defined by the partition walls 72 contain at least one kind of charged particles 5', instead of containing the electrophoretic dispersion liquid 10 in which at least one type of electrophoretic particles 5 are dispersed in the liquid-phase dispersion medium 6.

In other words, the electron particle flowing type display device 25 is similar to the electrophoretic display device 20 of the third embodiment described above except that the charged particles 5' move within a gas phase, instead of the electrophoretic particles 5 electrophoretically moving within the liquid phase dispersion medium 6 in the sealed sections 405 like the electrophoretic display device 20.

In the electron particle flowing type display device 25, in accordance with the present embodiment, two types of the charged particles, i.e., colored particles 5'$b$ and white particles 5'$a$ are enclosed. For example, when the white particles 5'a that are positively charged, and the colored particles 5'b that are negatively charged are used, the white particles 5a move within the closed space (a gas phase) 71 toward the side of the first electrode 3 when a voltage is applied between the electrodes 3 and 4 in a manner that the first electrode 3 has a negative potential. On the other hand, the black particles 5b move within the closed space 71 toward the second electrode 4.

The method of driving a display device in accordance with the present invention described above in the first and second embodiments is also applied to the electron particle flowing type display device 25 of the present embodiment with such a structure, and actions and effects similar to those describes above can be obtained.

<Electronic Apparatus>

A display device (a display device of the invention), such as, the electrophoretic display device 20 and the electron particle flowing type display device 25 that use the driving method of the present invention described above can be incorporated in a variety of electronic apparatuses. Hereinafter, electronic apparatuses (electronic apparatuses of the present invention) equipped with a display device such as the electrophoretic display device 20 or the electron particle flowing type display device 25 will be described.

<<Electronic Paper>>

First, description will be made regarding an embodiment in which the electronic apparatus of the present invention is applied to an electronic paper.

Figure 9:
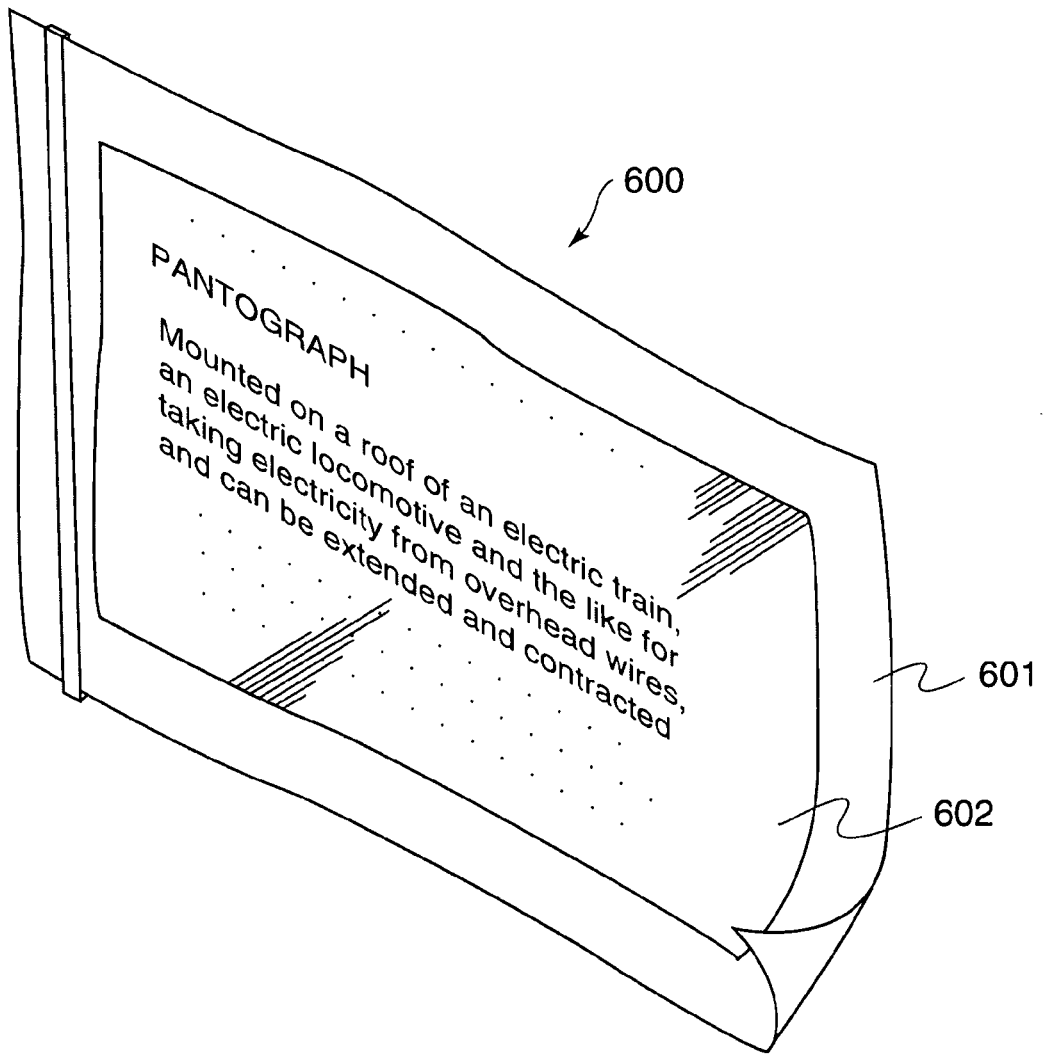
FIG. 9 is a perspective view showing an embodiment in which an electronic apparatus of the invention is applied to an electronic paper.

FIG. 9 is a perspective view showing an embodiment in which the electronic apparatus according to the present invention is applied to an electronic paper.

An electronic paper 600 shown in FIG. 9 includes a main body 601 formed of a rewritable sheet having the same texture and flexibility as those of a paper sheet, and a display unit 602.

In such an electronic paper 600, the display unit 602 is formed from the electrophoretic display device 20 or the electron particle flowing type display device 25 described above.

<<Display>>

Next, description will be made regarding an embodiment in which the electronic apparatus of the present invention is applied to a display.

Figure 10A:
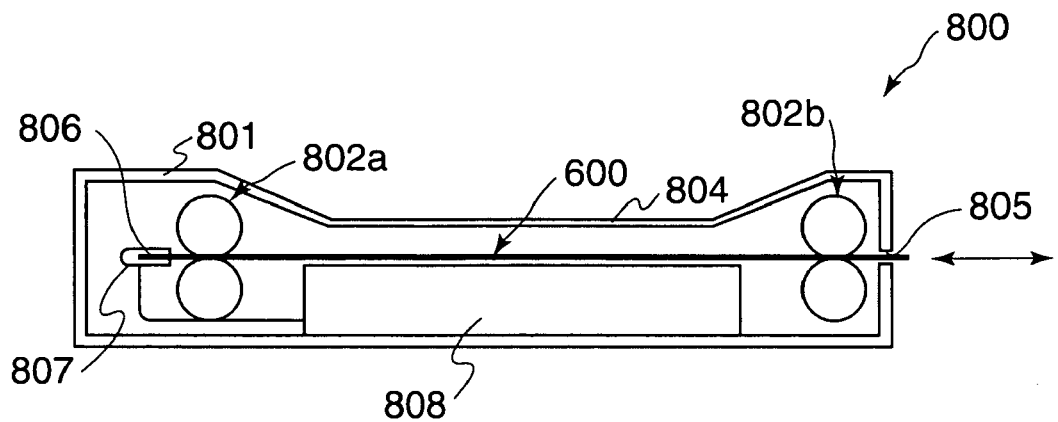
FIGS. 10(a) and 10(b) are views showing an embodiment in which an electronic apparatus of the invention is applied to a display.
Figure 10B:
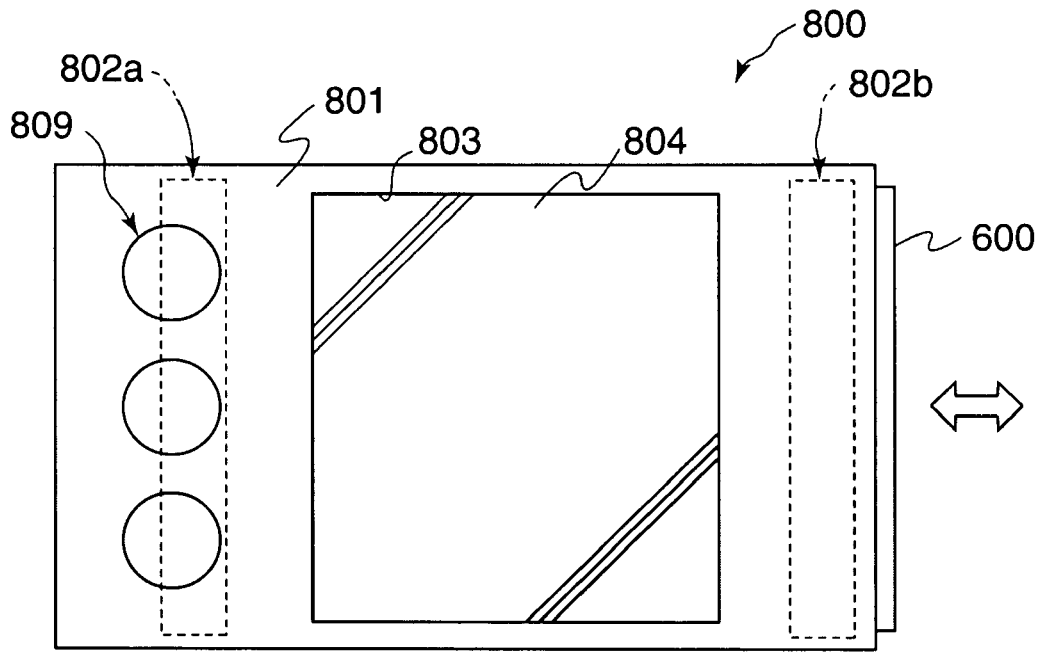

FIG. 10 are views showing an embodiment in which the electronic apparatus according to the present invention is applied to a display.

In FIG. 10, (a) is a cross-sectional view, and (b) is a plan view.

A display (display device) 800 shown in FIG. 10 includes a main body portion 801 and an electronic paper 600 detachably attached to the main body portion 801. It is noted that the electronic paper 600 has a configuration similar to the one described above, in other words, the configuration shown in FIG. 9.

The main body portion 801 is provided on its one lateral side (the right side in FIG. 10 (a)) with an insertion slot 805 through which the electronic paper 600 can be inserted, and is provided with two pairs of conveying rollers 802a and 802b inside. When the electronic paper 600 is inserted into the main body portion 801 through the insertion slot 805, the electronic paper 600 is held within the main body portion 801 in a state in which it is held by means of the pairs of conveying rollers 802a and 802b.

Also, a rectangular opening 803 is formed on a display surface side (the front side in FIG. 10 (b)) of the main body portion 801 and a transparent glass plate 804 is fitted to the rectangular opening 803. This allows the electronic paper 600 held within the main body portion 801 to be visually recognized from the outside of the main body portion 801. In other words, the display apparatus 800 composes a display surface through allowing the electronic paper 600 held within the main body portion 801 to be visually recognized through the transparent glass plate 804.

Moreover, a terminal portion 806 is formed in an insertion direction leading edge portion (the left side in FIG. 10) of the electronic paper 600, and provided within the main body portion 801 is a socket 807 that makes contact with the terminal portion 806 when the electronic paper 600 is placed within the main body portion 801. A controller 808 and an operation part 809 are electrically connected to the socket 807.

In the display apparatus 800 described above, the electronic paper 600 is removably fitted to the main body portion 801, and is portable and used in a state that it is removed from the main body portion 801.

Furthermore, in the display apparatus 800, the electronic paper 600 is formed from the electrophoretic display device 20 or the electron particle flowing type display device 25 described above.

It is noted that the electronic apparatus of the present invention is not limited to such applications as described above. For example, it is applicable to a television set, a viewfinder type or monitor viewing type video tape recorder, a car navigation system, a pager, an electronic notebook, an electronic calculator, an electronic newspaper, a word processor, a personal computer, a workstation, a TV phone, a POS terminal, a device provided with a touch panel and the like. The electrophoretic display device 20 or the electron particle flowing type display device 25 described above can be applied to display parts of these various kinds of electronic apparatuses.

While the method of driving a display device, the display devices and the electronic apparatuses in accordance with the present invention have been described above based on the illustrated embodiments, the present invention is not limited thereto. The construction of each part may be replaced by an arbitrary construction having the same function. Furthermore, other arbitrary constituents or steps may be added to the present invention.

[Embodiment Examples]

Next, concrete embodiment examples of the invention will be described. In the following, embodiments in which the method of driving a display device of the present invention is applied to an electrophoretic display device were made.

1. Manufacturing of Electrophoretic Display Device

<1> First, titanium oxide particles as white particles and titanium black particles as black particles were prepared. Then, these particles were dispersed within dimethyl silicone oil (liquid-phase dispersion medium), thereby preparing an electrophoretic dispersion liquid. It is noted that surfaces of the titanium oxide particles and the titanium black particles were graft-modified so as to be charged with mutually opposite polarities.

Then, melamine, urea, formaldehyde solution and ammonia water were mixed, thereby preparing a capsule forming material of composite resin with melamine resin and urea resin. Then the electrophoretic dispersion liquid was dropped on the capsule forming material. By this, microcapsule precursors in which the electrophoretic dispersion liquid is contained in capsules of the composite resin were obtained.

Then, the microcapsule precursors and deionized water were mixed, thereby obtaining capsule dispersed liquid.

Next, polycarboxylic acid, epoxy compound and water were mixed, thereby preparing a capsule forming material of epoxy resin.

Then, the capsule forming material of epoxy resin was added to the capsule dispersed liquid prepared in advance, and further a bridging agent was added. By this, outer layers composed of epoxy resin were formed on surfaces of the microcapsule precursors (inner layers).

By the steps described above, microcapsules having capsule bodies with two-layer structure containing therein the electrophoretic dispersion liquid were obtained. Thereafter, microcapsules with an average grain size of 42 μm were obtained by classification.

<2> Next, acryl-based binder was dissolved in ethanol, thereby obtaining an ethanol solution. The microcapsules were added in the ethanol solution, thereby preparing microcapsule dispersion liquid. It is noted that the mixing ratio of the microcapsules and the binder was 1:1 in weight ratio.

<3> Next, a PET-ITO substrate having electrodes formed with ITO was prepared. Then, the microcapsule dispersion liquid was formed into a microcapsule-containing layer having an average thickness of 45 μm on the ITO of the PET-ITO substrate by a doctor blade method.

<4> Then, a circuit board having individual electrodes composed of ITO formed thereon and equipped with the circuit shown in FIG. 2 was arranged on the microcapsule-containing layer and, thereafter they were bonded by using a roll laminator, thereby obtaining a bonded body.

<5> Next, edge sections (outer circumferential portions) of the bonded body were sealed by epoxy-based adhesive. By this, the electrophoretic display device 20 shown in FIG. 1 was obtained.

2. Driving of Electrophoretic Display Device

Embodiment Example 1

<1> First, a voltage was applied between the pair of electrodes of the electrophoretic display device, thereby setting a black color display state.

<2> Then, for switching to a white color display, the operation of setting the pair of electrodes to the first state and then to the second state was repeated two times in total. (First Stage).

It is noted that, at this time, the time of keeping the first state and the time of keeping the second state were both set to 100 msec.

<3> Next, the operation of setting the pair of electrodes to the first state and then to the third state was repeated five times in total. (Second stage).

It is noted that, at this time, the time of keeping the first state and the time of keeping the third state were both set to 20 msec.

<4> Next, the operation of setting the pair of electrodes to the first state and then to the second state was repeated four times in total, thereby switching to a white color display. (Third stage).

It is noted that, at this time, the time of keeping the first state and the time of keeping the second state were both set to 100 msec.

It is noted that, for the steps <2>- <4>described above, the voltage applied between the pair of electrodes in the first state was set to 15 V.

<5>Next, the white color display was switched to the black color display in a manner similar to the aforementioned steps <2>- <4>except that the voltage applied between the pair of electrodes in the first state was given in an inverse potential.

(Embodiment Example 2)

<1> First, a voltage was applied between the pair of electrodes of the electrophoretic display device, thereby setting a black color display state.

<2> Then, for switching to a white color display, the operation of setting the pair of electrodes to the first state and then to the second state was repeated two times in total.

It is noted that, at this time, the time of keeping the first state and the time of keeping the second state were both set to 100 msec.

<3> Next, the operation of setting the pair of electrodes to the first state and then to the third state was repeated five times in total. It is noted that, at this time, the time of keeping the first state and the time of keeping the third state were set to 20 msec and 100 msec, respectively.

<4> Next, the operation of setting the pair of electrodes to the first state and then to the second state was repeated two times in total, thereby switching to a white color display.

It is noted that, at this time, the time of keeping the first state and the time of keeping the second state were both set to 100 msec.

It is noted that, for the steps <2>- <4>described above, the voltage applied between the pair of electrodes in the first state was set to 15V.

<5>Next, the white color display was switched to the black color display in a manner similar to the aforementioned steps <2>- <4>except that the voltage applied between the pair of electrodes in the first state was given in an inverse potential.

Comparison Example 1

<1> First, a voltage was applied between the pair of electrodes of the electrophoretic display device, thereby setting a black color display state.

<2> Then, the operation of setting the pair of electrodes to the first state and then to the second state was repeated four times in total, thereby switching to a white color display.

It is noted that, at this time, the time of keeping the first state and the time of keeping the second state were both set to 100 msec.

Also, the voltage applied to the pair of electrodes in the first state was set to 15V.

<3>Next, the white color display was switched to the black color display in a manner similar to the aforementioned step <2> except that the voltage applied between the pair of electrodes in the first state was given in an inverse potential.

Comparison Example 2

1> First, a voltage was applied between the pair of electrodes of the electrophoretic display device, thereby setting a black color display state.

<2> Then, the operation of setting the pair of electrodes to the first state and then to the second state was repeated eight times in total, thereby switching to a white color display.

It is noted that, at this time, the time of keeping the first state and the time of keeping the second state were both set to 100 msec.

Also, the voltage applied to the pair of electrodes in the first state was set to 15V.

<3>Next, the white color display was switched to the black color display in a manner similar to the aforementioned step <2> except that the voltage applied between the pair of electrodes in the first state was given in an inverse potential.

Comparison Example 3

1> First, a voltage was applied between the pair of electrodes of the electrophoretic display device, thereby setting a black color display state.

<2> Then, the pair of electrodes was set to the first state, thereby switching to a white color display.

It is noted that, at this time, the time of keeping the first state was set to 100 msec, and the voltage applied to the pair of electrodes in the first state was set to 15V.

<3> Next, the white color display was switched to the black color display in a manner similar to the aforementioned step <2> except that the voltage applied between the pair of electrodes in the first state was given in an inverse potential.

Comparison Example 4

<1> First, a voltage was applied between the pair of electrodes of the electrophoretic display device, thereby setting a black color display state.

<2> Then, the pair of electrodes was set to the first state, thereby switching to a white color display.

It is noted that, at this time, the time of keeping the first state was set to 400 msec, and the voltage applied to the pair of electrodes in the first state was set to 15V.

<3> Next, the white color display was switched to the black color display in a manner similar to the aforementioned step <2> except that the voltage applied between the pair of electrodes in the first state was given in an inverse potential.

3. Evaluation of Electrophoretic Display Device

As for display switching drive of the electrophoretic display devices in each of the embodiment examples and each of the comparison examples, the reflectance of displayed color in each of the cases was measured 3 seconds after switching of each color was completed.

It is noted that the reflectance of a displayed color of each of the electrophoretic display devices indicates the rate of the amount of reflection of the displayed color of the electrophoretic display device, when the amount of reflection of reference white color (standard sample) is 100.

Also, the reflectance was measured by using a luminance colorimeter ("BM-5A" manufactured by TOPCON).

Furthermore, using the reflectance of each of the colors measured in the comparison example 1 as a reference value, the relative ratio was obtained for the reflectance of each of the colors measured in each of the embodiment examples and each of the comparison examples.

The reflectance and relative ratio in each of the embodiment examples and each of the comparison examples thus obtained are shown in Table 1 below.

As shown in Table 1, as for the reflectance measured on the electrophoretic display device of each of the embodiment examples, all the results obtained indicate that the reflectance in displaying white color is higher, and the reflectance in displaying black color is lower, compared to the reflectance measured on the electrophoretic display device of the comparison example 1.

In contrast, as for the reflectance measured on the electrophoretic display device of each of the comparison examples, the results obtained indicate that the reflectance in displaying white color is lower, and the reflectance in displaying black color does not particularly change or tends to become higher, compared to the reflectance measured on the electrophoretic display device of the comparison example 1.

It has become clear from the above that, by providing the third state in which no voltage is applied across the pair of electrodes between the plural first states at the time of switching a displayed color, the reflectance in displaying white color can be made higher, and the reflectance in displaying black color can be made lower and, as a result, the contrast in displaying each color can be favorably improved.

The invention claimed is:

1. A method of driving a display device having
    a first electrode,
    a second electrode,
    a display section that is provided between the first electrode and the second electrode and includes movable particles that move by application of a voltage between the first electrode and the second electrode,
    a capacitance element that is electrically connected to the first electrode, and
    a voltage application switching element for applying a voltage to both of the first electrode and the capacitance element,
the method of driving a display device characterized in comprising:
    a first state in which the voltage application switching element is placed in ON state to apply a voltage between the first electrode and the second electrode and to charge an electric charge in the capacitance element,
    a second state in which the voltage application switching element is placed in OFF state so that the voltage is applied between the first electrode and the second

TABLE 1

| | Driving Condition of Electrophoretic Display Device | | | | | | | | | Evaluation Result | | | |
|---|---|---|---|---|---|---|---|---|---|---|---|---|---|
| | First Stage | | | Second Stage | | | Third Stage | | | In White Display | | In Black Display | |
| | First State [msec] | Second State [msec] | Repetition Number | First State [msec] | Third State [msec] | Repetition Number | First State [msec] | Second State [msec] | Repetition Number | Reflectance [%] | Relative Ratio to Comparison Example 1 | Reflectance [%] | Relative Ratio to Comparison Example 1 |
| Embodiment Example 1 | 100 | 100 | 2 | 20 | 20 | 5 | 100 | 100 | 4 | 35.70 | 0.37 | 4.01 | −0.01 |
| Embodiment Example 2 | 100 | 100 | 2 | 20 | 100 | 5 | 100 | 100 | 2 | 38.77 | 3.44 | 3.87 | −0.15 |
| Comparison Example 1 | 100 | 100 | 4 | — | — | — | — | — | — | 35.33 | — | 4.02 | — |
| Comparison Example 2 | 100 | 100 | 8 | — | — | — | — | — | — | 35.30 | −0.03 | 3.99 | −0.02 |
| Comparison Example 3 | 100 | — | — | — | — | — | — | — | — | 33.22 | −5.10 | 4.49 | 0.57 |
| Comparison Example 4 | 400 | — | — | — | — | — | — | — | — | 34.70 | −4.79 | 4.05 | 0.19 | electrode through discharging of the electric charge stored in the capacitance element, and a third state in which the voltage is not applied between the first electrode and the second electrode and the electric charge stored in the capacitance element is discharged, wherein the voltage application switching element is connected to a voltage application device that is capable of applying a desired voltage, and the third state is set by placing the voltage application switching element in OFF state after the electric charge stored in the capacitance element has been discharged by setting the voltage application device to 0 potential while maintaining the voltage application switching element in ON state.

2. A method of driving a display device set forth in claim 1, having a first stage in which the second state is set after setting the first state, and a second stage in which the third state is set after setting the first state.

3. A method of driving a display device set forth in claim 2, wherein the first stage is set prior to the second stage.

4. A method of driving a display device set forth in claim 3, wherein the first stage is conducted plural times.

5. A method of driving a display device set forth in claim 3, wherein the second stage is conducted plural times.

6. A method of driving a display device set forth in claim 3, wherein, after the second stage, a third stage of setting the second state after setting the first state is conducted.

7. A method of driving a display device set forth in claim 1, wherein the time of setting the first state is 1-400 msec.

8. A method of driving a display device set forth in claim 1, wherein the time of setting the second state is 10-500 msec.

9. A method of driving a display device set forth in claim 1, wherein the time of setting the third state is 10-200 msec.

10. A method of driving a display device set forth in claim 1, wherein the display device is an electrophoretic display device with the display section that is equipped with an electrophoretic layer containing at least one type of electrophoretic particles.

11. A display device driven by the method of driving a display device set forth in claim 1.

12. An electronic apparatus comprising the display device set forth in claim 11.

13. A method of driving a display device having
a first electrode,
a second electrode,
a display section that is provided between the first electrode and the second electrode and includes movable particles that move by application of a voltage between the first electrode and the second electrode,
a capacitance element that is electrically connected to the first electrode, and
a voltage application switching element for applying a voltage to both of the first electrode and the capacitance element,
the method of driving a display device characterized in comprising:

a first state in which the voltage application switching element is placed in ON state to apply a voltage between the first electrode and the second electrode and to charge an electric charge in the capacitance element, a second state in which the voltage application switching element is placed in OFF state so that the voltage is applied between the first electrode and the second electrode through discharging of the electric charge stored in the capacitance element, and a third state in which the voltage is not applied between the first electrode and the second electrode and the electric charge stored in the capacitance element is discharged, wherein an erasing switching element that is connected to the capacitance element is further provided, and the third state is set by discharging the electric charge stored in the capacitance element by placing the erasing switching element in ON state while maintaining the voltage application switching element in OFF state.

14. A method of driving a display device set forth in claim 13, having a first stage in which the second state is set after setting the first state, and a second stage in which the third state is set after setting the first state.

15. A method of driving a display device set forth in claim 14, wherein the first stage is set prior to the second stage.

16. A method of driving a display device set forth in claim 15, wherein the first stage is conducted plural times.

17. A method of driving a display device set forth in claim 15, wherein the second stage is conducted plural times.

18. A method of driving a display device set forth in claim 15, wherein, after the second stage, a third stage of setting the second state after setting the first state is conducted.

19. A method of driving a display device set forth in claim 13, wherein the display device is an electrophoretic display device with the display section that is equipped with an electrophoretic layer containing at least one type of electrophoretic particles.

20. A display device driven by the method of driving a display device set forth in claim 13.

* * * * *